(12) United States Patent
Comer

(10) Patent No.: US 12,054,227 B2
(45) Date of Patent: Aug. 6, 2024

(54) MATCHING MESHES FOR VIRTUAL AVATARS

(71) Applicant: Magic Leap, Inc., Plantation, FL (US)

(72) Inventor: Sean Michael Comer, Encino, CA (US)

(73) Assignee: Magic Leap, Inc., Plantation, FL (US)

( * ) Notice: Subject to any disclaimer, the term of this patent is extended or adjusted under 35 U.S.C. 154(b) by 435 days.

(21) Appl. No.: 17/385,620

(22) Filed: Jul. 26, 2021

(65) Prior Publication Data

US 2021/0358214 A1 Nov. 18, 2021

Related U.S. Application Data

(62) Division of application No. 16/274,677, filed on Feb. 13, 2019, now Pat. No. 11,074,748.

(Continued)

(51) Int. Cl.
| | |
|---|---|
| *G06T 17/20* | (2006.01) |
| *B63B 21/26* | (2006.01) |
| *B63B 35/44* | (2006.01) |
| *B63H 21/32* | (2006.01) |
| *F01N 13/00* | (2010.01) |

(Continued)

(52) U.S. Cl.
CPC ............ *B63B 21/26* (2013.01); *B63B 35/44* (2013.01); *B63H 21/32* (2013.01); *F01N 13/004* (2013.01); *G06T 13/40* (2013.01); *G06T 17/20* (2013.01); *G06T 19/20* (2013.01); *G06V 40/10* (2022.01); *F01N 2590/02* (2013.01)

(58) Field of Classification Search
CPC ......... G06T 17/20; G06T 13/40; G06T 19/20; B63B 35/44; B63H 21/32; F01N 13/004; F01N 2590/02; G06K 9/00362; G06K 9/03

See application file for complete search history.

(56) References Cited

U.S. PATENT DOCUMENTS

| | | |
|---|---|---|
| 6,850,221 B1 | 2/2005 | Tickle |
| 9,081,426 B2 | 7/2015 | Armstrong |

(Continued)

FOREIGN PATENT DOCUMENTS

WO  WO 2019/168673  9/2019

OTHER PUBLICATIONS

Invitation to Pay Additional Fees, re PCT Application No. PCT/US19/17792, mailed Apr. 24, 2019.

(Continued)

*Primary Examiner* — Phuc N Doan
(74) *Attorney, Agent, or Firm* — Seed IP Law Group LLP

(57) ABSTRACT

Examples of systems and methods for matching a base mesh to a target mesh for a virtual avatar or object are disclosed. The systems and methods may be configured to automatically match a base mesh of an animation rig to a target mesh, which may represent a particular pose of the virtual avatar or object. Base meshes may be obtained by manipulating an avatar or object into a particular pose, while target meshes may be obtain by scanning, photographing, or otherwise obtaining information about a person or object in the particular pose. The systems and methods may automatically match a base mesh to a target mesh using rigid transformations in regions of higher error and non-rigid deformations in regions of lower error.

20 Claims, 20 Drawing Sheets

Related U.S. Application Data

(60) Provisional application No. 62/635,939, filed on Feb. 27, 2018.

(51) Int. Cl.
    *G06T 13/40*     (2011.01)
    *G06T 19/20*     (2011.01)
    *G06V 40/10*     (2022.01)

(56) References Cited

U.S. PATENT DOCUMENTS

| | | |
|---|---|---|
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 2006/0028436 A1 | 2/2006 | Armstrong |
| 2007/0081123 A1 | 4/2007 | Lewis |
| 2010/0134490 A1 | 6/2010 | Corazza et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2014/0375628 A1 | 12/2014 | Saito |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0178988 A1 | 6/2015 | Mora et al. |
| 2015/0205126 A1 | 7/2015 | Schowengerdt |
| 2015/0206341 A1 | 7/2015 | Loper et al. |
| 2015/0213646 A1 | 7/2015 | Ma et al. |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0065976 A1 | 3/2016 | He et al. |
| 2016/0157751 A1 | 6/2016 | Mahfouz |
| 2017/0032055 A1 | 2/2017 | Eisemann et al. |
| 2017/0032579 A1 | 2/2017 | Eisemann et al. |
| 2017/0046840 A1 | 2/2017 | Chen et al. |
| 2017/0301133 A1* | 10/2017 | Min .................. G06T 15/503 |
| 2019/0073826 A1* | 3/2019 | Bailey .................. G06T 17/20 |
| 2019/0147666 A1 | 5/2019 | Keustermans et al. |
| 2019/0266796 A1 | 8/2019 | Comer |

OTHER PUBLICATIONS

International Search Report and Written Opinion, re PCT Application No. PCT/US19/17792, mailed Jun. 24, 2019.

International Preliminary Report for Patentability, re PCT Application No. PCT/US19/17792, issued Aug. 27, 2020.

Amberg, et al., "Optimal Step Nonrigid ICP Algorithms for Surface Registration," Proceedings / CVPR, IEEE Computer Society Conference on Computer Vision and Pattern Recognition. Jun. 2007.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality-Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Joshi, et al., "Harmonic Coordinates for Character Articulation," ACM SIGGRAPH 2007.

Optimal Step Nonrigid ICP-File Exchange-MATLAB Central, mathworks.com, https://www.mathworks.com/matlabcentral/fileexchange/54077-optimal-step-nonrigid-icp?requestedDomain=www.mathworks.com&s_tid=gn loc_drop, Retrieved Feb. 6, 2018.

R3DS, Russian3DScanner, http://www.russian3dscanner.com/, Retrieved Feb. 6, 2018, in 3 pages.

Savoye, et al., "Multi-Layer Level of Detail for Character Animation," Workshop in Virtual Reality Interactions and Physical Simulation, VRIPHYS 2008.

Sumner et al., "Deformation Transfer for Triangle Meshes," SIGGRAPH, Published Aug. 2004.

Tanriverdi and Jacob, "Interacting With Eye Movements in Virtual Environments," Department of Electrical Engineering and Computer Science, Tufts University, Medford, MA-paper/Proc. ACM CHI 2000 Human Factors in Computing Systems Conference, pp. 265-272, Addison-Wesley/ACM Press (2000).

Wikipedia: "Iterative closest point", Wikipedia, Retrieved Feb. 10, 2018, in 3 pages. URL: https://en.wikipedia.org/wiki/Iterative_closest_point.

Wrap3 Tutorials / R3DS, http://www.russian3dscanner.com/wrap3-tutorials/, retrieved Feb. 6, 2018, in 4 pages.

Xu et al.: "Multilevel active registration for kinect human body scans: from low quality to high quality." Multimedia Systems, vol. 24:257-270, published online Mar. 10, 2017.

Zientara et al.: "Individualized avatars with complete anatomy constructed from the ANSUR II 3-D anthropometric database," In: Int. J. Digital Human, vol. 1, No. 4, published online Jun. 21, 2017.

Achenbach, et al., "Fast generation of realistic virtual humans," Virtual Reality Software and Technology, ACM, Nov. 8, 2017.

Casas, et al., "Rapid Photorealistic Blendshape Modeling from RGB-D Sensors," Computer Animation and Social Agents, ACM May 23, 2016.

Chang, et al., "Global registration of dynamic range scans for articulated model reconstruction," ACM Transactions on Graphics, vol. 30, No. 3, May 1, 2011.

* cited by examiner

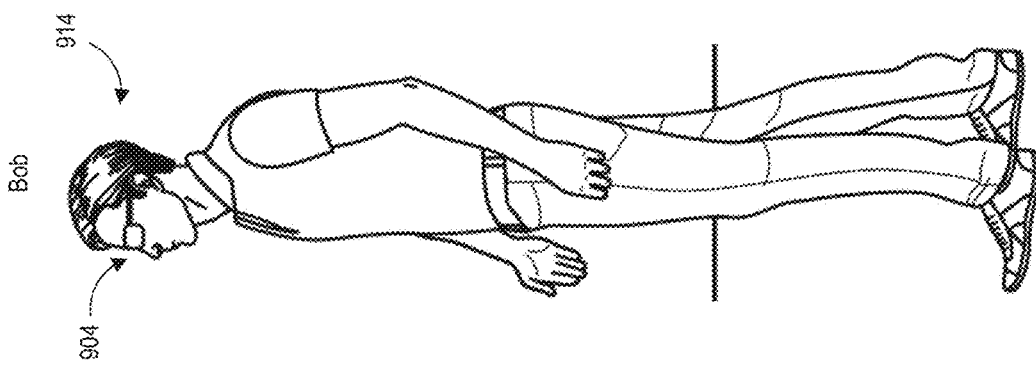
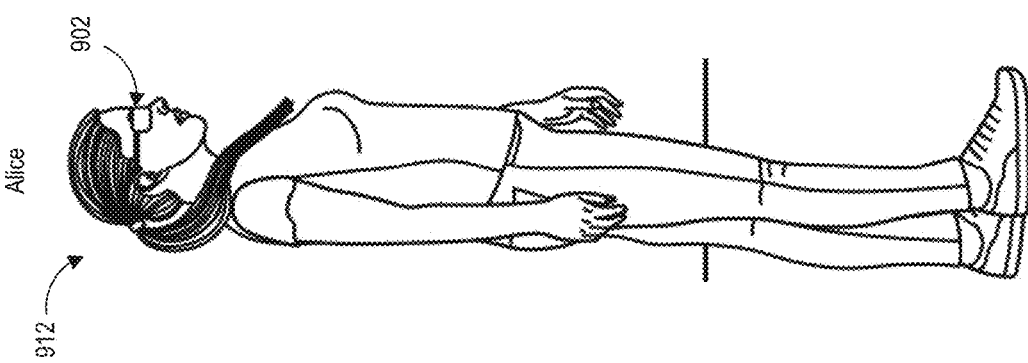
FIG. 9B

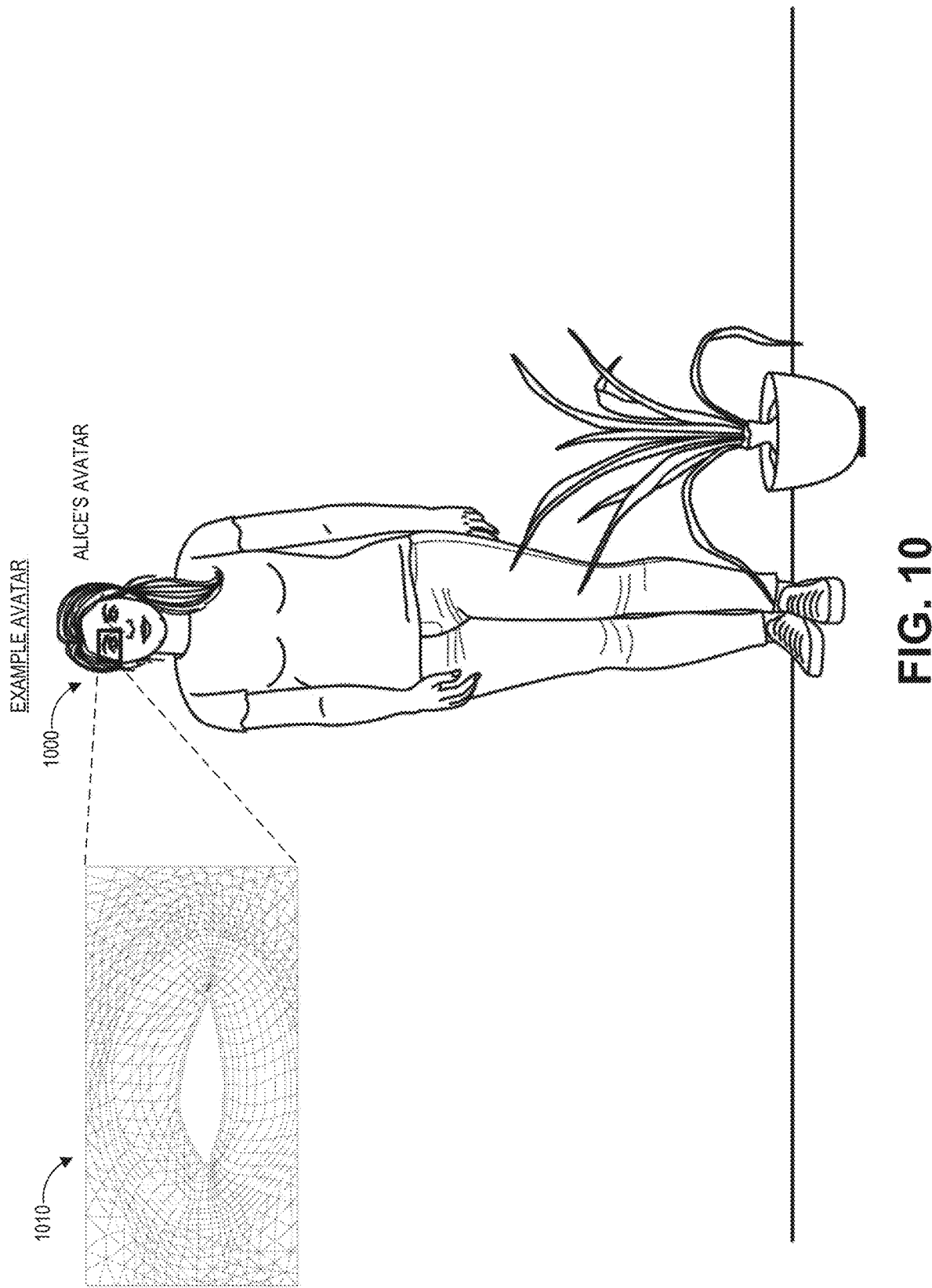

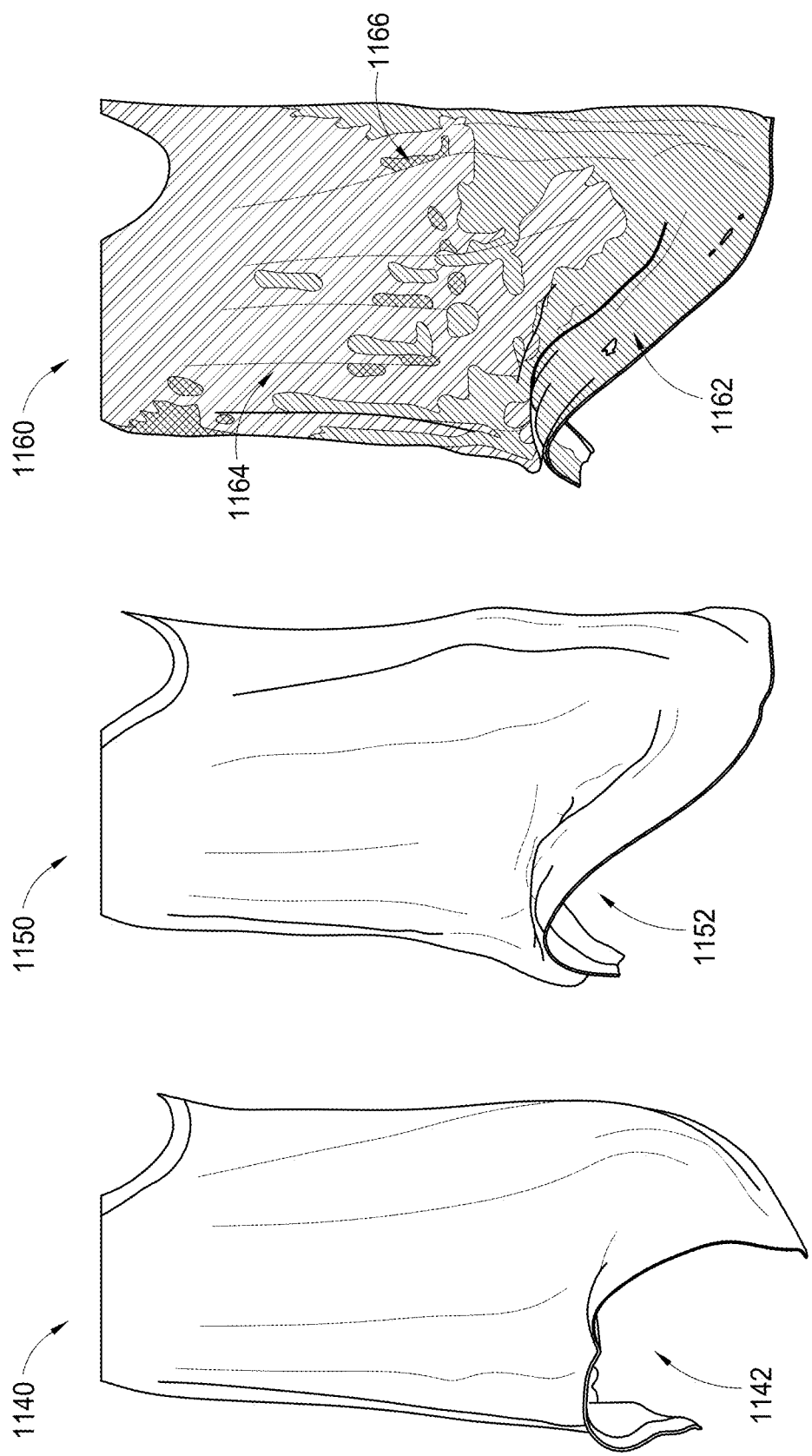

MATCHING MESHES FOR VIRTUAL AVATARS

CROSS-REFERENCE TO RELATED APPLICATIONS

This application is a divisional application of U.S. application Ser. No. 16/274,677, filed on Feb. 13, 2019, which is entitled "Matching Meshes for Virtual Avatars," which claims the benefit of priority to U.S. Patent Application No. 62/635,939, filed on Feb. 27, 2018, which is entitled "Matching Meshes for Virtual Avatars," which is hereby incorporated by reference herein in its entirety.

FIELD

The present disclosure relates to virtual reality and augmented reality, including mixed reality, imaging and visualization systems and more particularly to rigging systems and methods for animating virtual characters, such as avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR, and MR technology.

SUMMARY

Examples of systems and methods for matching a base mesh to a target mesh for a virtual avatar are disclosed. The systems and methods may be configured to automatically match a base mesh of an animation rig to a target mesh, which may represent a particular pose of the virtual avatar. Base meshes may be obtained by manipulating an avatar into a particular pose, while target meshes may be obtain by scanning, photographing, or otherwise obtaining information about a person or object in the particular pose. The systems and methods may automatically match a base mesh to a target mesh using rigid transformations in regions of higher error and non-rigid deformations in regions of lower error.

For example, an automated system can match a first mesh to a second mesh for a virtual avatar. The first mesh may represent a base mesh of an animation rig and the second mesh may represent a target mesh, which may in some cases be obtained from photogrammetric scans of a person performing a target pose.

In various implementations, the system can first register the first mesh to the second mesh and then conform the first mesh to the second mesh. The system may identify a first set of regions where the first mesh and the second mesh are not matched to a first error level and a second set of regions where the first mesh and the second mesh are not matched to a second error level, with the second error level is less than the first error level. The system may apply a rigid transformation in the first set of regions and a non-rigid transformation in the second set of regions. The system can iterate this transformation process until the error between the first and the second meshes is less than an error tolerance.

In other implementations, the system may match a first mesh to a second mesh by matching relatively large subregions and iteratively matching progressively smaller subregions until a convergence criterion is met.

In other implementations, the system identifies a first set of subregions of a first mesh and a second set of subregions of the first mesh. For example, the first set and the second set of subregions can form a checkerboard pattern. The system can apply a rigid transformation on the first set of subregions to match the first set of subregions to a target mesh. The system may match the second set of subregions to the target mesh via interpolation. The system may iterate this procedure, e.g., by swapping the first and second sets of subregions.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 9B illustrates an example telepresence session.

FIG. 10 illustrates an example of an avatar as perceived by a user of a wearable system.

FIG. 11B illustrates example meshes of a shirt including a base mesh, a target mesh, and a transfer mesh obtained by matching the base mesh to the target mesh.

Figure 1:
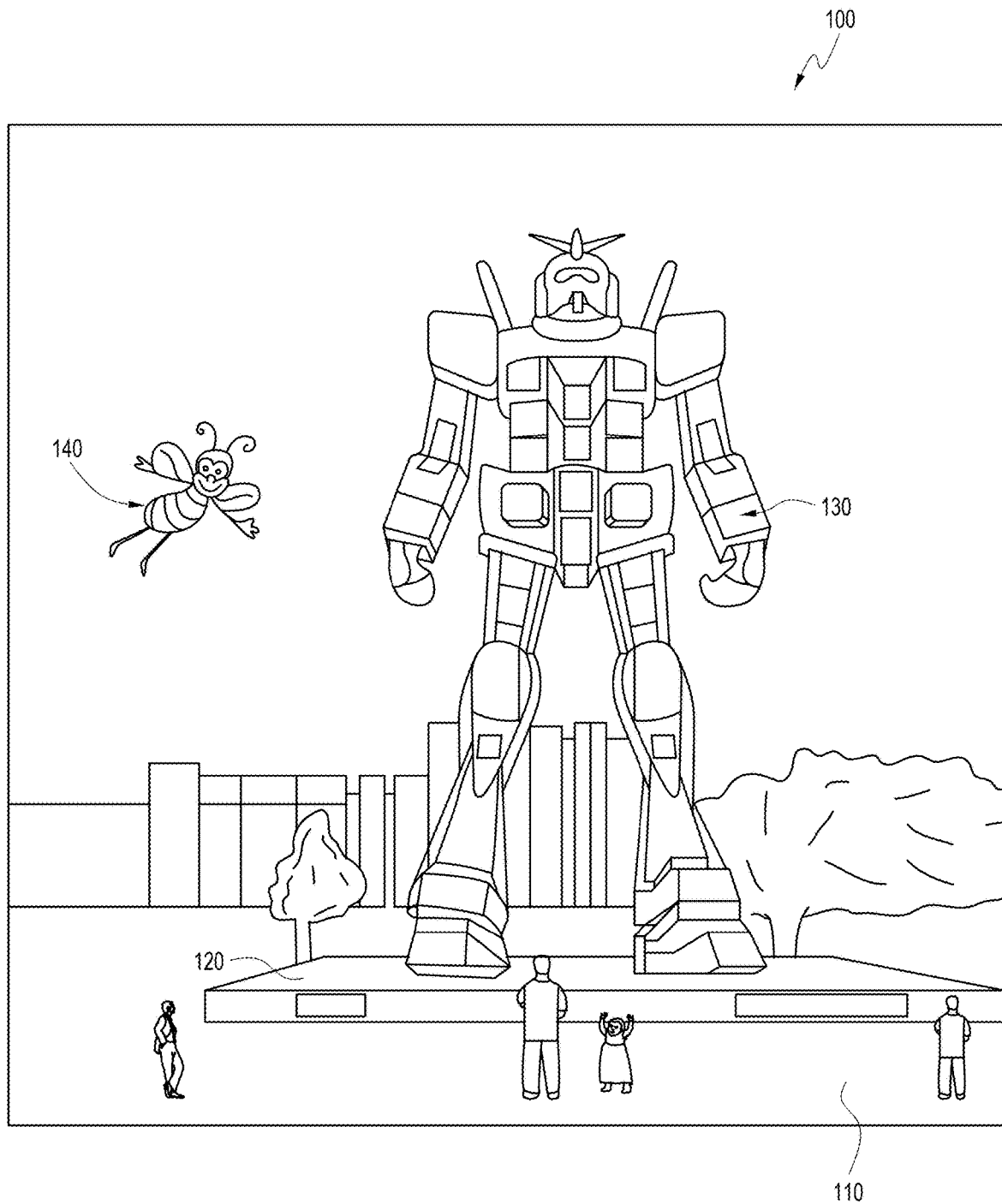
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved animation of avatars and a more realistic interaction between a user of the wearable system and avatars in the user's environment. Although the examples in this disclosure generally describe animating a human-shaped avatar, similar techniques can also be applied to animals, fictitious creatures, objects, etc.

A wearable device can include a display for presenting an interactive VR/AR/MR environment that includes a high fidelity digital avatar. Creation of a high fidelity digital avatar can take many weeks or months of work by a specialized team and can utilize a large number of high quality digitized photographic scans of the human model. Embodiments of the disclosed technology have the capability of creating high quality or high fidelity avatars (or digital representations in general) of any human, animal, character, or object. In order to accomplish this, embodiments of the disclosed process are faster and less resource intense (e.g., it may not be practical to put users through the same scanning process a professional model may experience) while still maintaining an accurate output.

As an example, a digital representation of a human (generally, any animal or deformable object such as clothing or hair) may include a skeleton and an overlying mesh (e.g., to show the outer surface, which may be skin, clothing, etc.). Each bone can have certain mesh vertices assigned to it, such that when the bone moves, the assigned vertices automatically move with the bone. This initial movement is called a "skin cluster" and generally captures gross movement. (It should be noted that the bones and skeleton are digital constructs and do not necessarily correspond to actual bones in the human body.) A subsequent step in modeling the human, which is sometimes referred to herein as an avatar, may be needed to capture finer movements of the skin, which is sometimes referred to herein as a surface or mesh. This subsequent step is sometimes referred to as a blendshape and represents differences from the initial gross movement to capture finer movements of the skin. Blendshapes may need to be obtained for some or all of the different poses that the digital representation moves into. As an example, a first blendshape may be needed for animating the digital representation to bend its arm halfway and a second blendshape may be needed for animating the digital represent to bend its arm fully.

With the present disclosure, methods and systems are provided for efficiently generating blendshapes for various poses of an avatar or digital representation of a human or animal (or other object). As an example, a computing system may obtain a base mesh of an avatar in a given pose, such as by moving one or more bones in a digital representation of a human into the given bones (e.g., to capture gross movement of the digital representation), and may obtain a target mesh in the given pose, such as by photographing a user (or object) in the given pose. The computing system may then attempt to match the base mesh to the target mesh in order to obtain a blendshape for that given pose (e.g., to determine how to adjust the base mesh, via a blendshape, such that the animated digital representation in the given pose matches the user or object in the given pose). The computing system may match the base mesh to the target mesh by generating a heatmap (which may show regions of higher and lower errors between the base and target meshes), applying rigid transformations moving the base mesh towards the target mesh in regions of higher error, and applying non-rigid deformations conforming the base mesh to the target mesh in regions of lower error. These processes may be repeated in an iterative fashion until a satisfactory match is obtained or some other condition is satisfied. As another example, the computing system may match subregions of the base mesh to the target mesh, and iteratively match additional subregions until a convergence criterion is met. After a satisfactory match is obtained or some other condition is satisfied, the computing system may generate one or more blendshapes for the given pose, which can then be used in refining the digital representation to more accurately reflect a real-world user (or object) in the given pose.

Accordingly, a variety of implementations of systems and methods for matching a first mesh onto a second mesh will be provided below.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
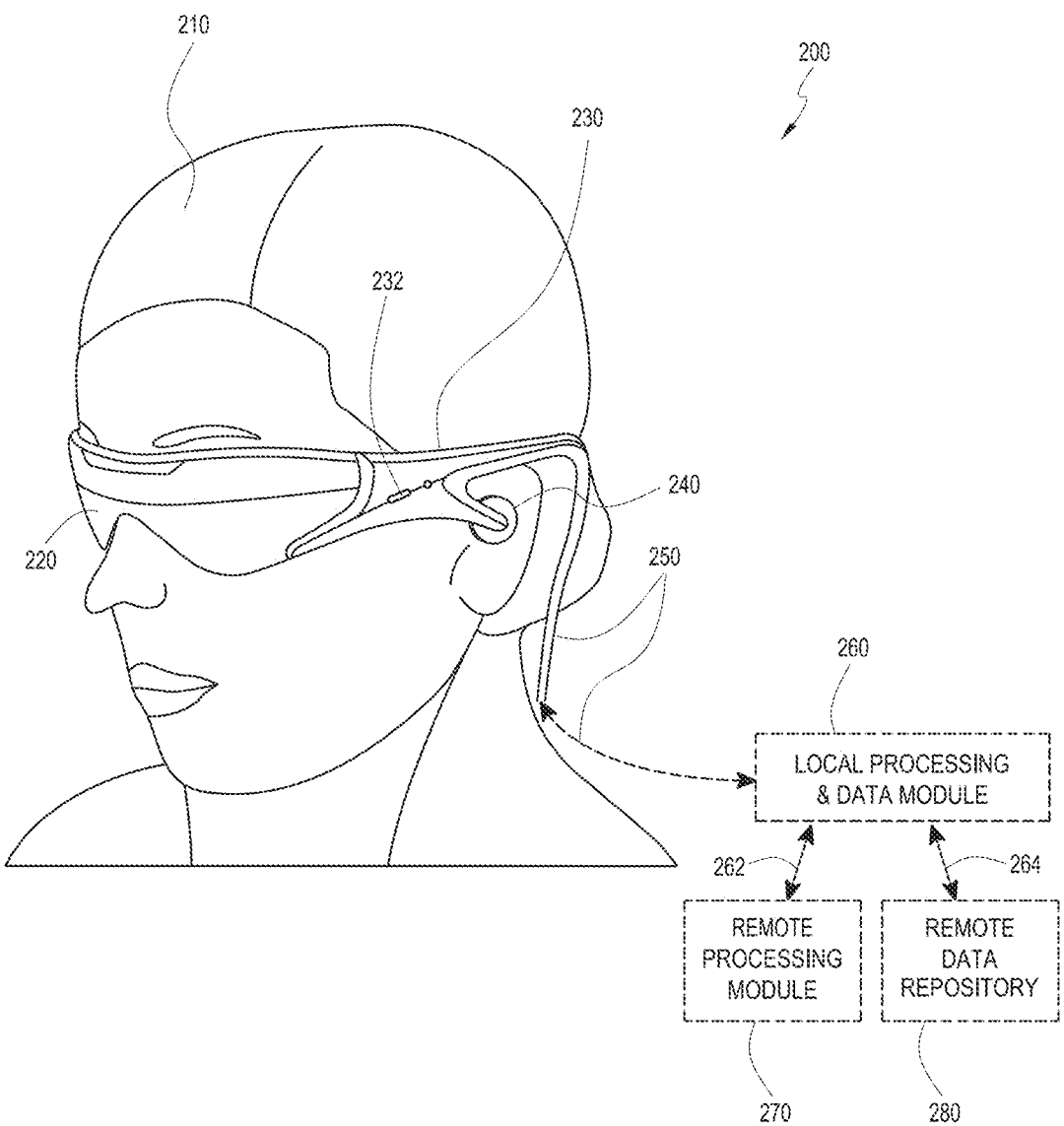
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
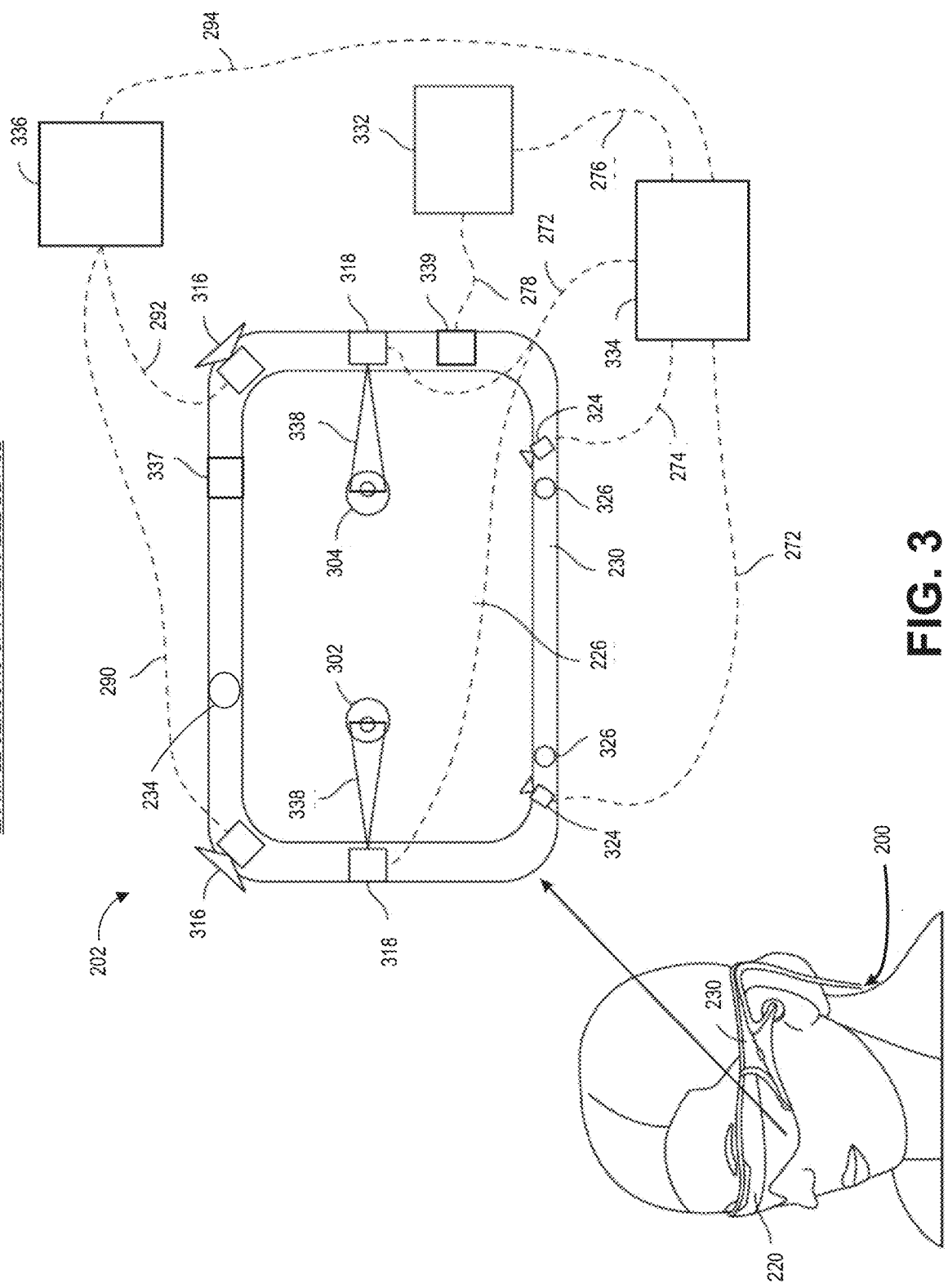
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A, The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
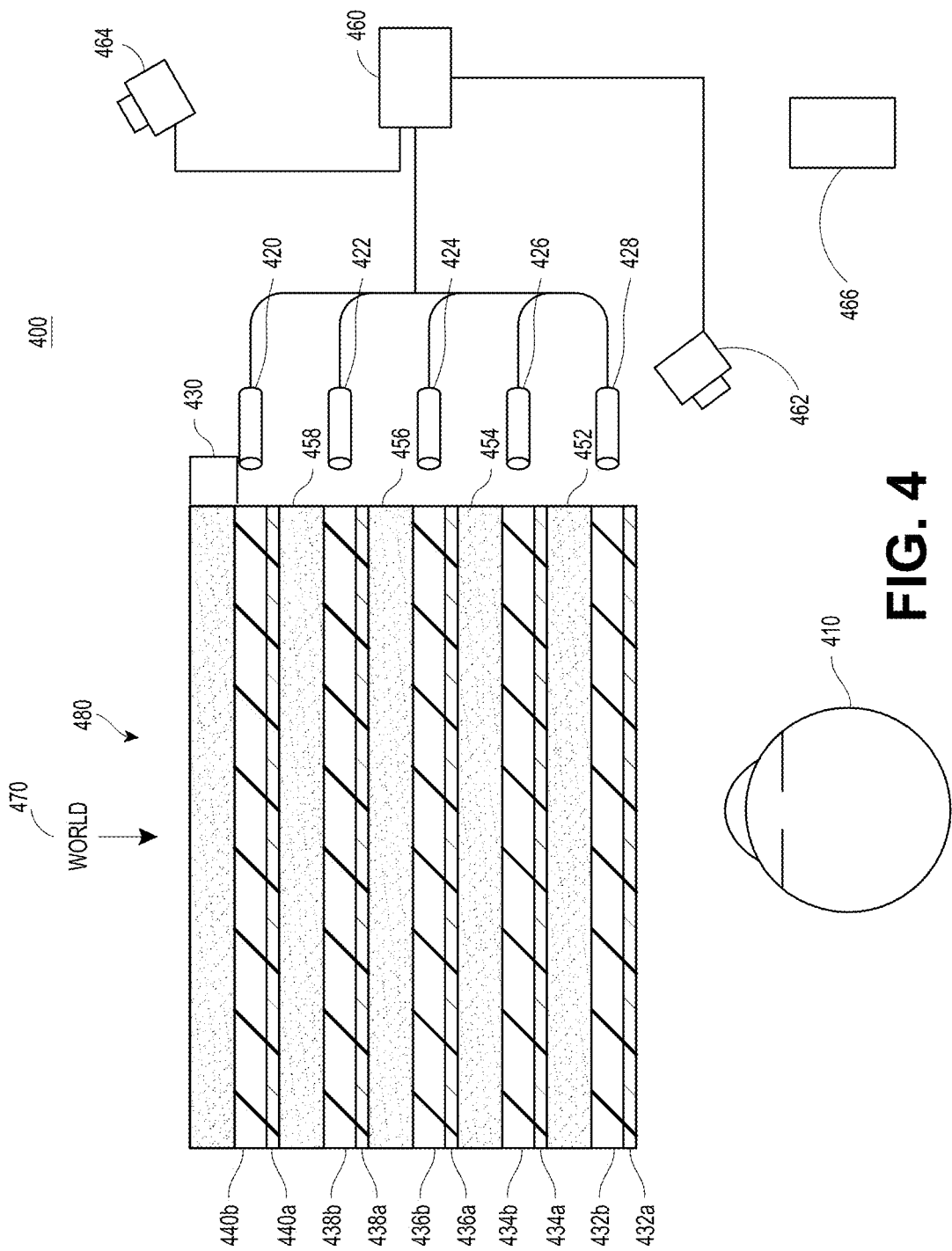
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 440b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
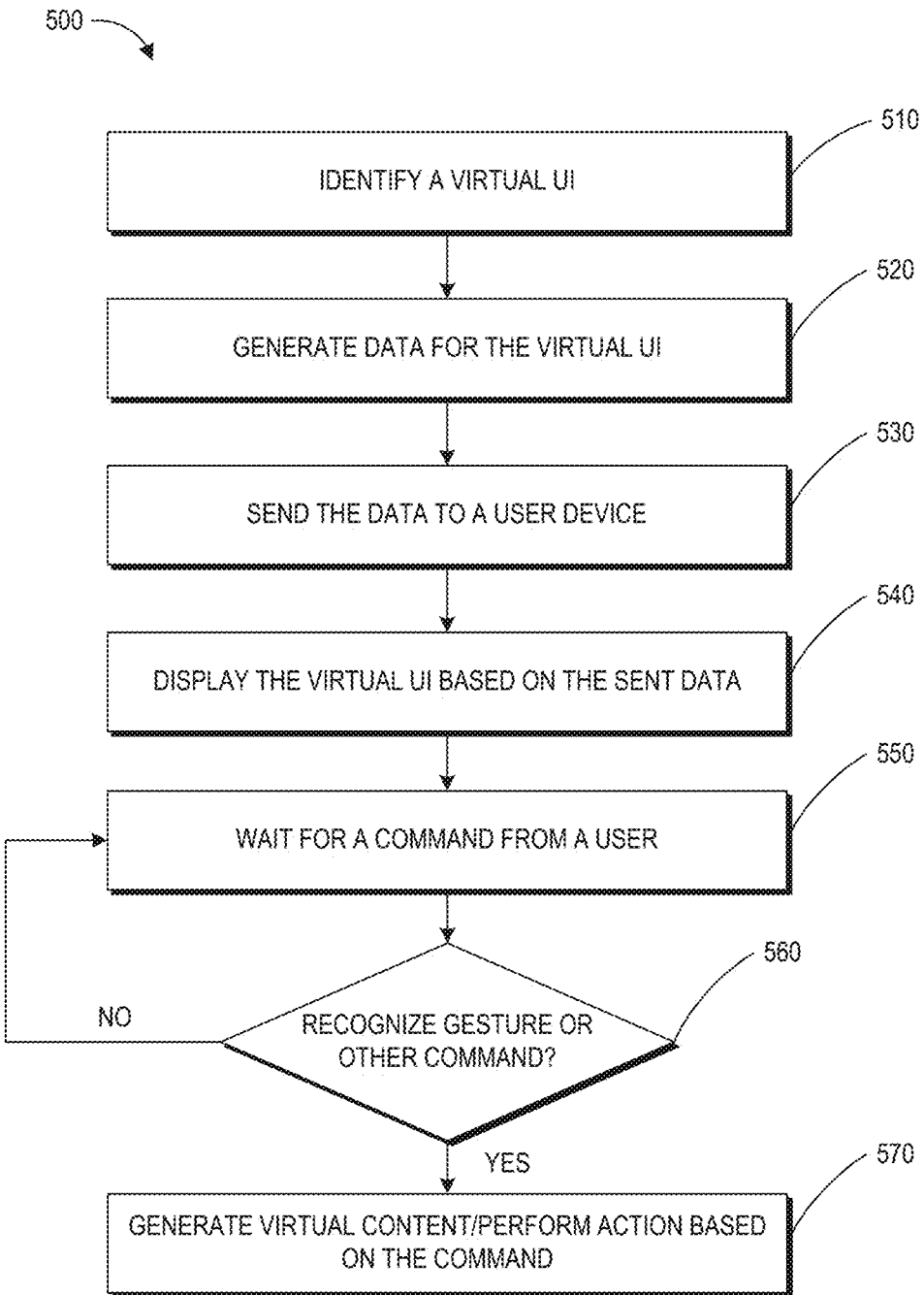
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
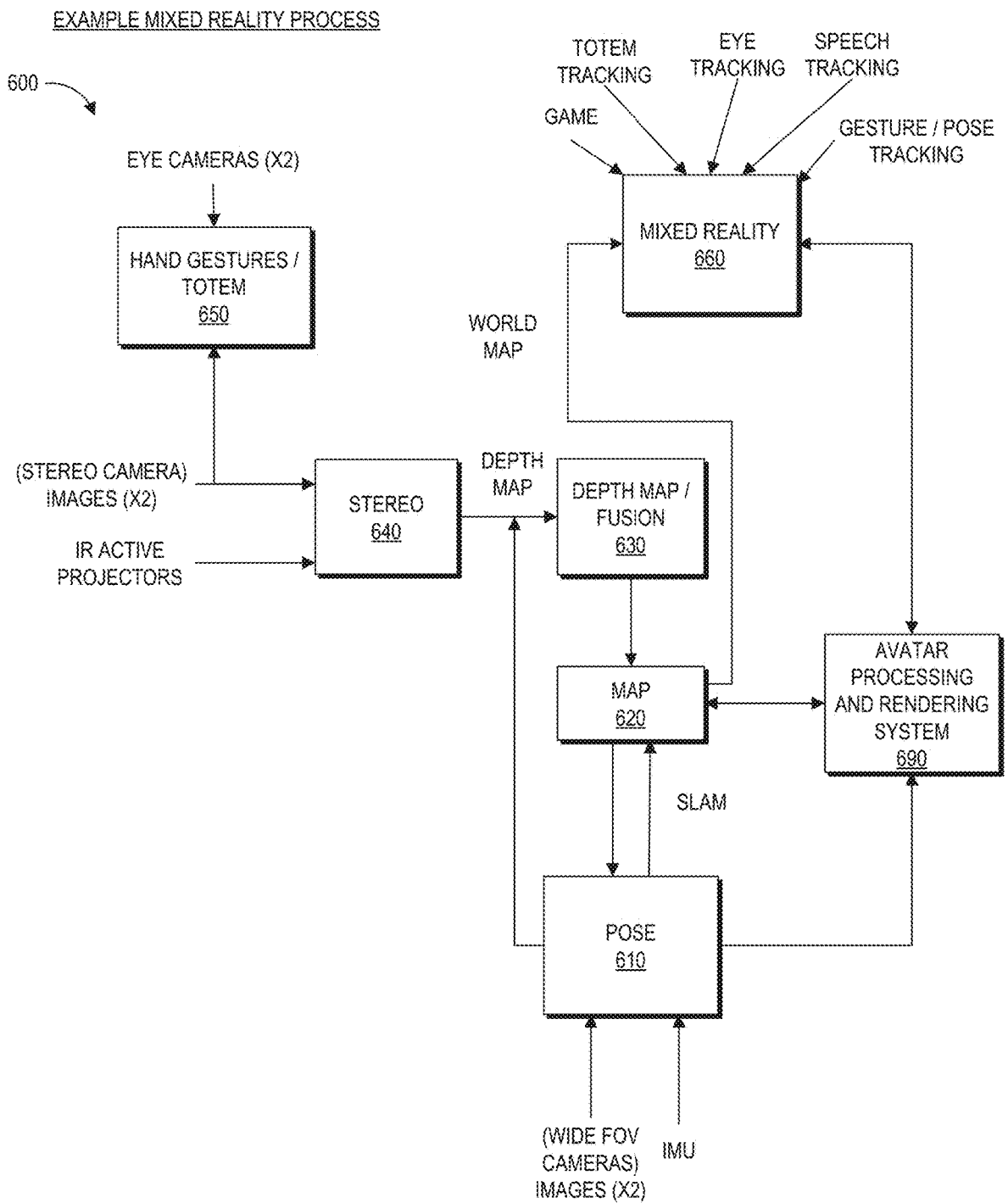
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
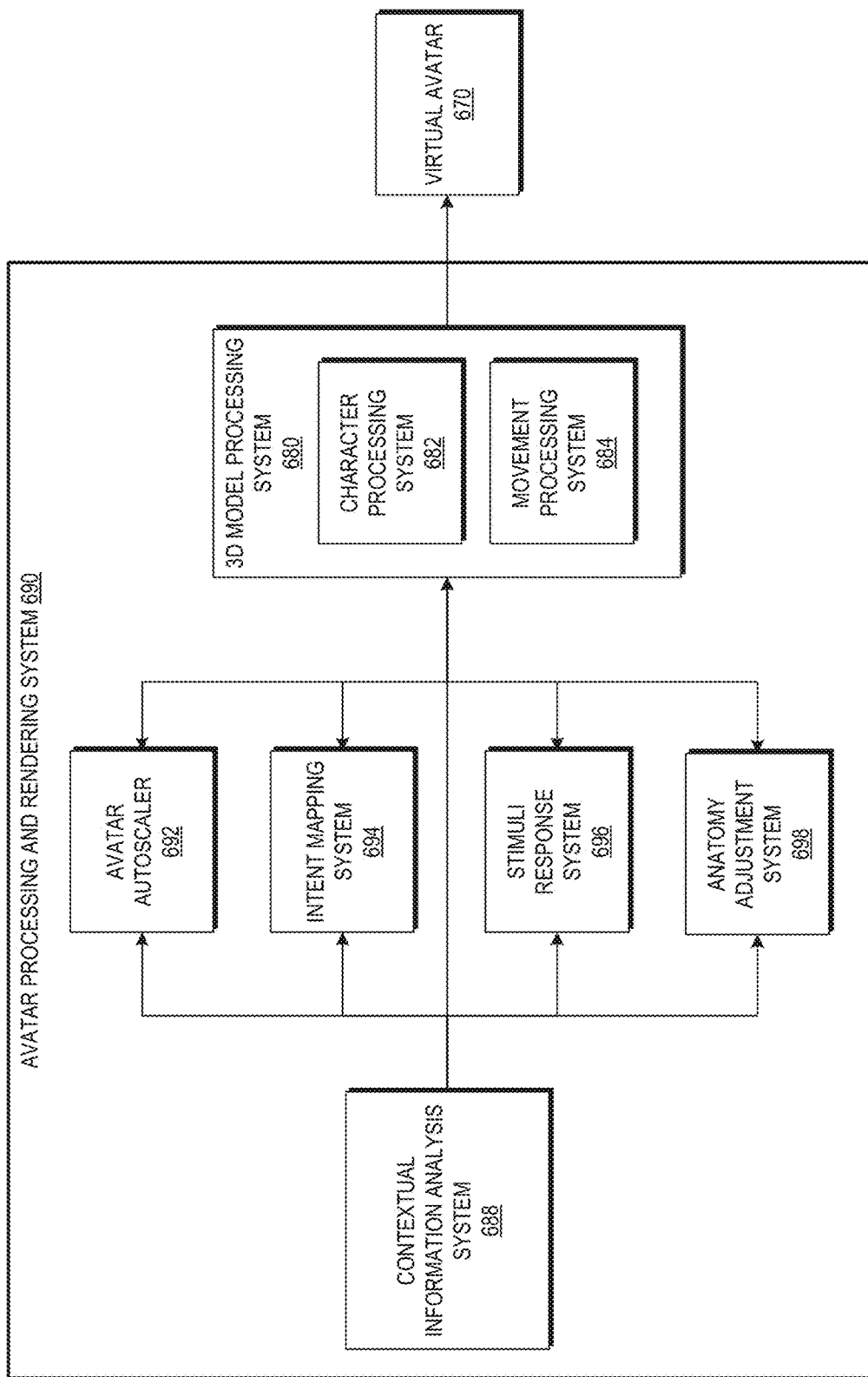
FIG. 6B illustrates example components of an avatar processing and rendering system.

FIG. 6B illustrates an example avatar processing and rendering system 690. The avatar processing and rendering system 690 can implement the mesh transfer techniques described with reference to FIGS. 11-14C. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc. For example, in some implementations, the movement processing system 684 performs the matching of a base mesh to a target mesh described below with reference to FIGS. 11A-14C.

Examples of Mapping a User's Environment

Figure 7:
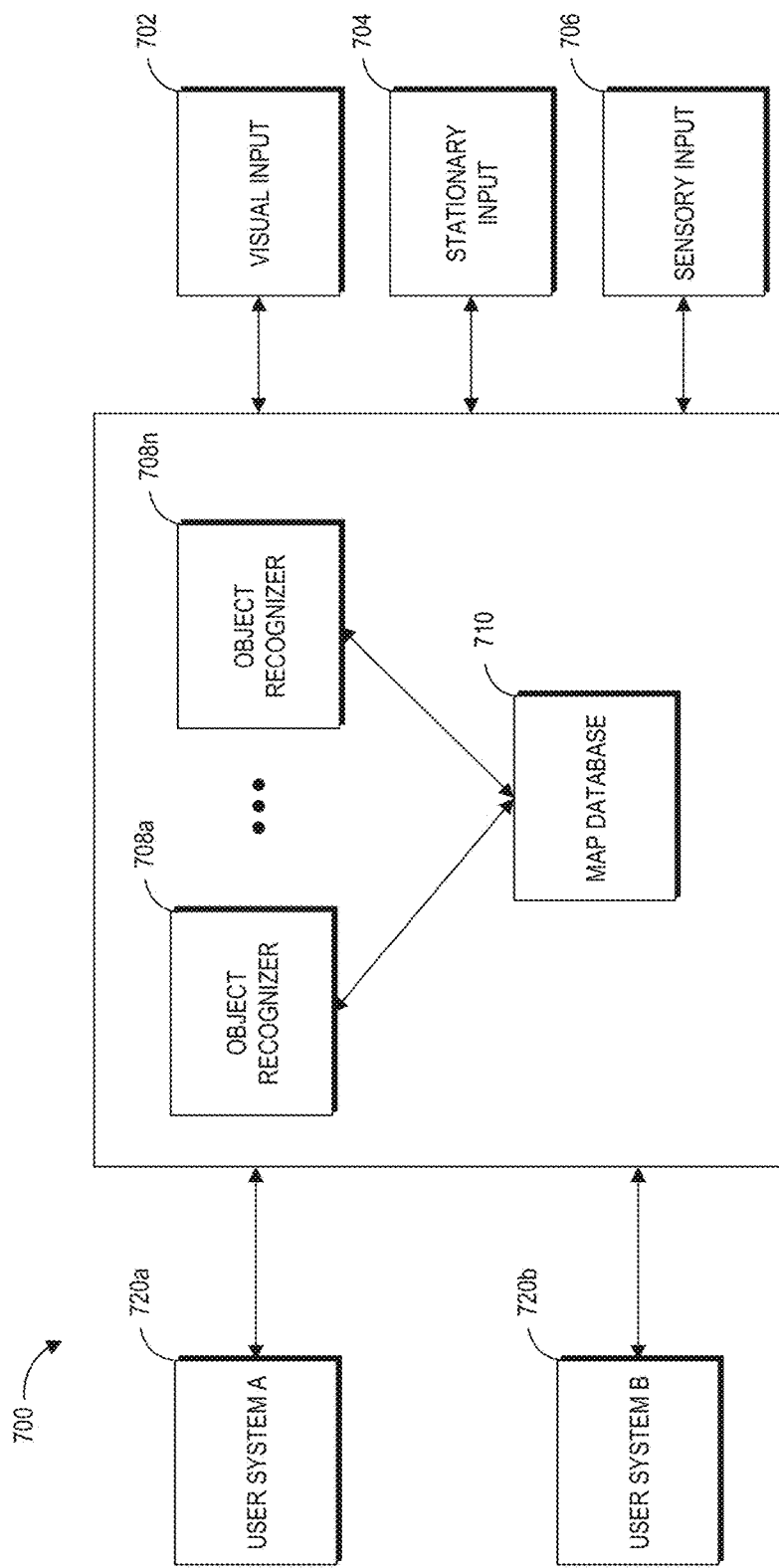
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
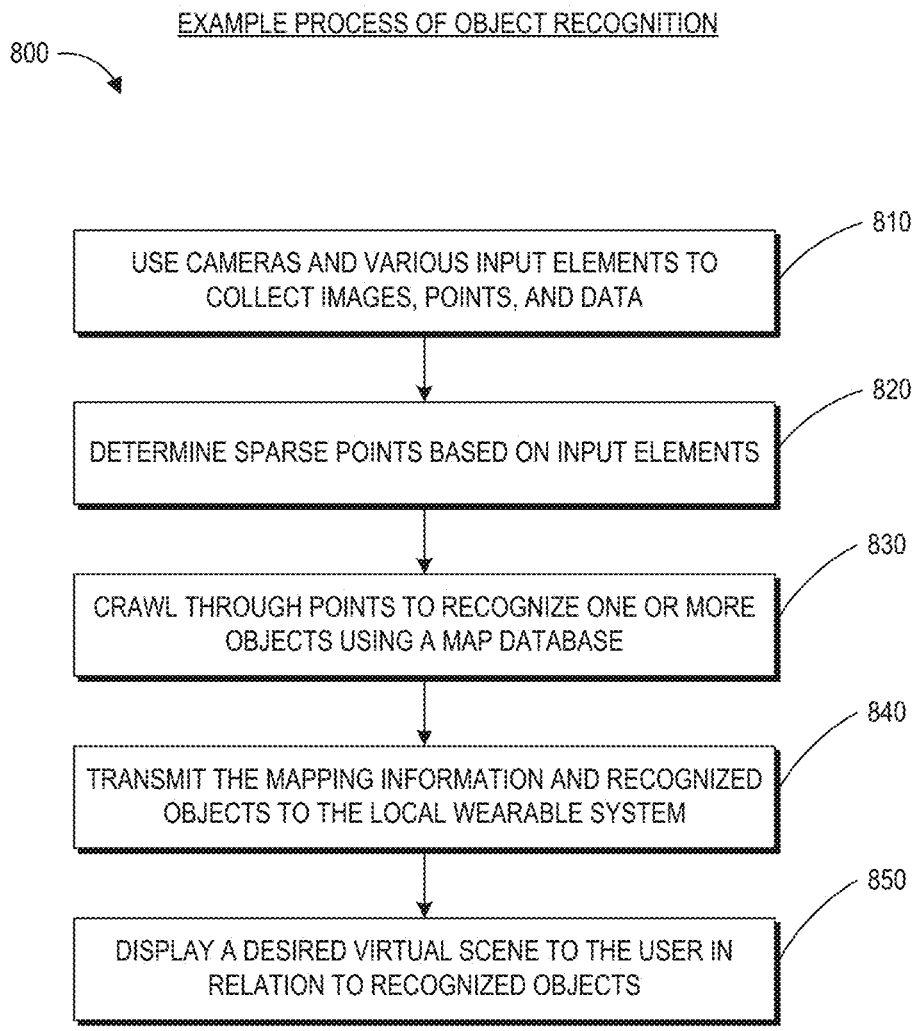
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
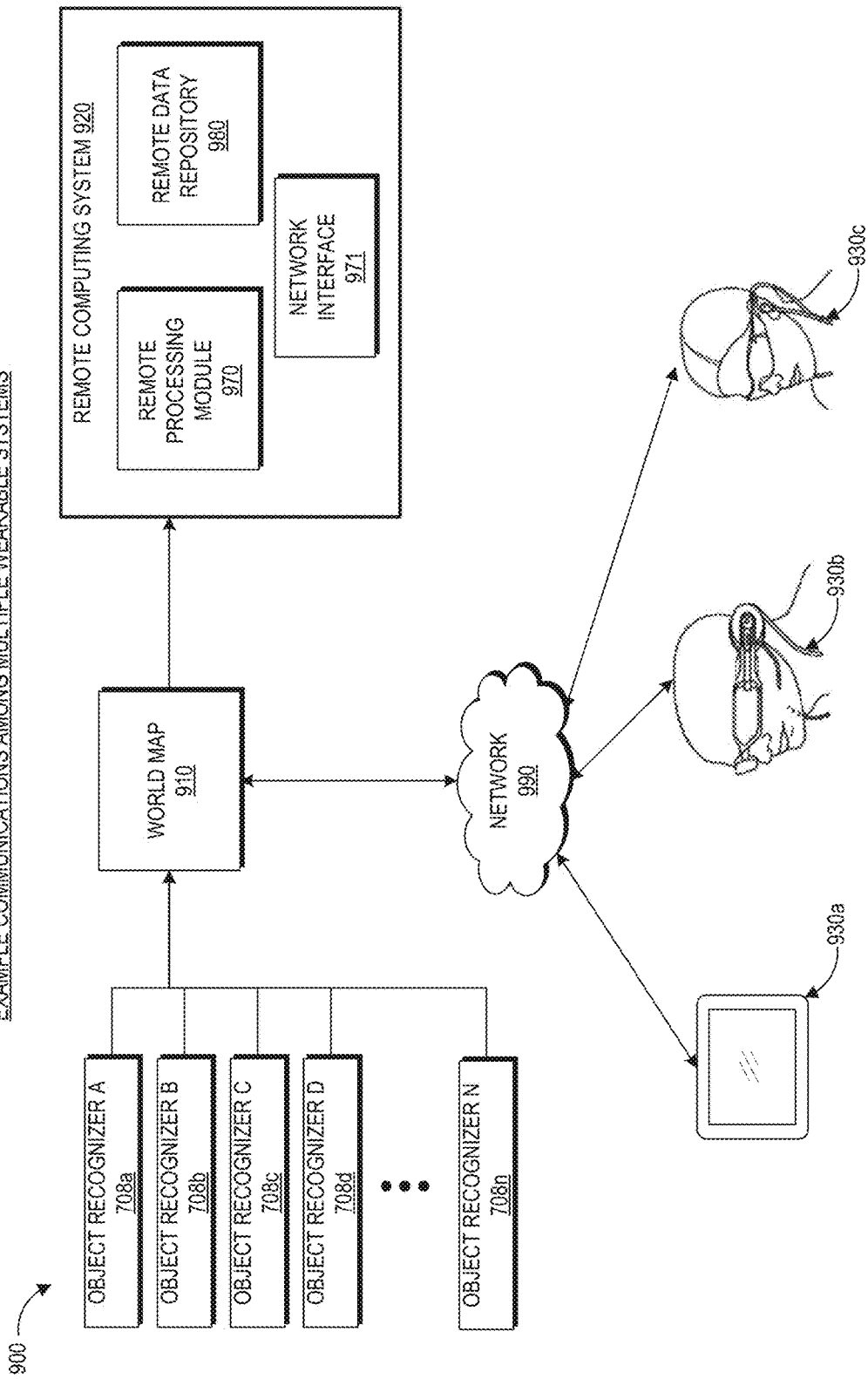
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session.

Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as size, appearance (e.g., skin color, complexion, hair style, clothes, and skin and facial features such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which includes translation(s) and rotation(s). An example application of an affine transform can be thought of as moving a set of one or more points in space without changing its size, though the orientation can change. Affine transformations can also include shear or scale changes.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combination with one another to achieve a desired complex deformation. For example, to produce a smile, the rig may apply, in combination, blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Matching Base Meshes to Target Meshes

As discussed herein, rigging includes techniques for transferring information about deformation of the body of an avatar (e.g., facial contortions, arm movements, leg movements, torso movements, head rotations and tilts, hand movements including grasping and pointing, etc.) onto a mesh. Animating a mesh (e.g., animating an avatar) may include deforming a mesh by moving some or all of the vertices that form the mesh to new positions in 3D space. The example avatar processing and rendering system 690 of FIG. 6B includes a 3D model processing system 680, which can implement a rig (e.g., a control system for deforming the mesh and animating an avatar). As a mesh may include large numbers of vertices, rigs typically provide common, desirable deformations as computerized commands that make it easier to control the mesh. For high-end visual effects productions such as movies, there may be sufficient production time for rigs to perform massive mathematical computations to achieve highly realistic animation effects—in other words, this context typically prioritizes high-quality at the expense of high-speed. But for real-time applications (such as in mixed reality), deformation speed can be very advantageous and different rigging techniques may be used—in other words, this context typically prioritizes high-speed at the expense of high-quality. Rigs often utilize deformations that rely on skeletal systems and/or blendshapes.

When making a partial or full body digital avatar, a large number of facial and/or body scans may be acquired as reference for avatar rig animations and deformations. A rig may include a base mesh, which may represent a neutral rest state of the body, that can be deformed by a skeletal structure of hierarchical matrices (such as a skin cluster) and using blendshapes. Scans of facial expressions and body poses may be used as references for blendshape deformations of the rig. These reference scans are usually unstructured geometry that are not coherent with a base mesh. The process of matching the form and shape of the reference scans to one or more base meshes previously required laborious amounts of hand sculpting vertices. As an example, individual reference or base scans would have to be manually sculpted into a target mesh for every single static rig pose (e.g., a straight arm pose, an arm bent at 45 degrees pose, an arm fully bent pose, etc.).

The present disclosure overcomes the challenges of laboriously matching reference scans to one or more base meshes using novel combinations of rigid transformations, non-rigid deformations, and iterations of such transformations and deformations, to procedurally match the shape and form of a base mesh to a scanned reference with minimal human intervention. In embodiments of the present disclosure, a system is provided that obtains a base mesh and a target mesh as inputs, procedurally matches the base mesh to the target mesh in a suitable manner, and outputs a matched base mesh (e.g., a transfer mesh or a blendshape that can be used to assist in animation of an avatar). In at least some embodiments, avatar processing and rendering system 690 of FIG. 6B may implement the techniques described herein for matching a base mesh to a target mesh.

As discussed herein in connection with FIG. 10, a mesh, or a polygon mesh, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000. The mesh 1010 may be relatively fine (e.g., have a relatively large number of points), to facilitate a high quality simulation of the complex curves and movements that occur in the eye region.

Examples of Matching Target Meshes to Base Meshes

Figure 11A:
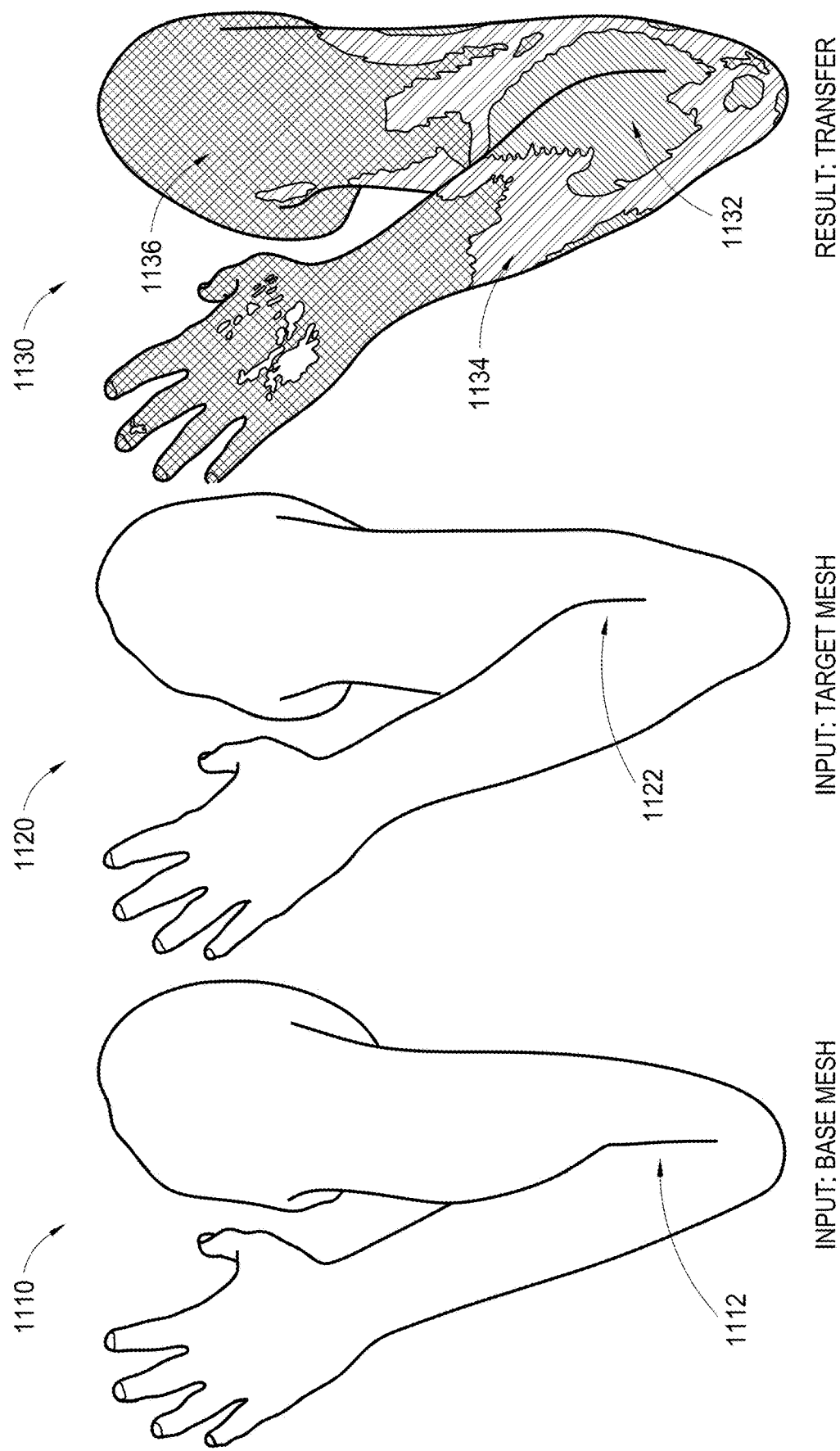
FIG. 11A illustrates example meshes of an arm including a base mesh, a target mesh, and a transfer mesh obtained by matching the base mesh to the target mesh.

FIGS. 11A-11B illustrate various examples, including an arm and a shirt, of base and target meshes that may be obtained or provided to the matching system of the present disclosure and transfer meshes (e.g., matched base meshes) that may be generated or provided by the matching system. Note that in FIGS. 11A-11B the vertices of the mesh are not shown. Base meshes may be obtained by deformation of the skeletal structure of a rig, from its neutral rest state into a desired pose. Target meshes may be obtained by reference scans of a person in the desired pose(s). In some embodiments, the reference scans may be 2D or 3D photographs or scans of a model. In other embodiments, the reference scans may be 2D or 3D photographs or scans of a user of an electronic device such as an AR, MR, or VR device. In such embodiments, the user may be posing in desired pose(s) at the direction of the electronic device (e.g., the electronic device may prompt the user to move into predetermined poses) or the electronic device may be tracking the user in real-time and animating an avatar to match the user's movements. These are merely illustrative examples and, in general, base, target, and transfer meshes may be obtained for any desired purposes.

In at least some embodiments, a base mesh may refer to a clean mesh or a set of structured vertices, edges, and faces that define a polyhedral object such as an avatar or other virtual object. Additionally, a target mesh may refer to a scan mesh or a set of unstructured vertices, edges, and faces that define a polyhedral object such as a model, a user, or an object. In some arrangements, clean or base meshes may be generated by deformation of a rig, while scan or target meshes may be generated or obtained using photogrammetry (e.g., the use of photography and other sensors in surveying and mapping to measure distances between objects; such as the 3D mapping of a person or object using cameras and other sensors).

As shown in base mesh 1110 of FIG. 11A, a rig may be deformed from a neutral rest state (which may be a state in which the rig's arm is extended in a relatively straight manner in this example) into a bent arm statement in which the person's left elbow is fully or nearly fully bent. As shown in base mesh 1110, a deformation of the rig into this position may not match a user's expected deformation. As an example, in the region 1112, the rig's forearm and upper arm skin may compress in a manner that appears unnatural (e.g., as a crease in the skin). In contrast and as shown in target mesh 1120 of FIG. 11A, a reference scan of a model or user in the same pose as the base mesh 1110 may have a more natural appearance in the elbow region 1122. In particular, the forearm may compress the bicep in target mesh 1122, rather than the bicep seemingly disappearing into the forearm as in base mesh 1112.

Using the systems and processes disclosed herein, the base mesh may be accurately conformed to the target mesh. In some of these systems and processes, a heatmap 1130 may be used to identify regions of the base mesh (or target mesh) where there are errors (e.g., deviations between the spatial positions of vertices in the meshes) of different magnitudes. As an example, present techniques for matching a base mesh to a target mesh may identify regions of relatively high error, such as regions 1132 (shown with single-line hatching), regions of relatively moderate error, such as regions 1134 (shown with double-line hatching), and regions of relatively low error, such as regions 1136 (shown with cross-hatching and, in portions of the hand having particularly low error, without hatching), where error relates to the difference in position of a given vertex in the base mesh relative to the position of the corresponding vertex in the target mesh. As shown in FIG. 11A, the base mesh may have relatively high positional differences (e.g., high error) from the target mesh in the regions where the forearm and upper arm muscles compress against each other. Additionally, the base mesh may have slightly lower positional differences (e.g., medium error) in the regions of the forearm and upper arm near the high error regions and may have little to no positional differences (e.g., no or low error) in regions away from the elbow, such as the hand and shoulder.

The examples 1130, 1160 of FIGS. 11A and 11B may be referred to as heatmaps, with errors between the base and target meshes illustrated visually. As one example, regions of relatively low or no error may be denoted by blue coloring (or a certain type of marking such as the cross-hatching of FIGS. 11A and 11B), regions of relatively moderate error may be denoted by green coloring (or another type of marking such as the double-line hatching of FIGS. 11A and 11B), and regions of relatively high error may be denoted by red coloring (or yet another type of marking such as the single-line hatching of FIGS. 11A and 11B). For example, the region 1112 where the elbow shows an unnatural crease is in the high error, single-hatched region 1132 in the heatmap 1130.

Error, in these examples, may refer to three-dimensional distances between corresponding pairs of vertices between the base and target meshes. In some examples, high error regions may have distance errors in excess of less than 0.2 cm, approximately 0.2 cm, 0.4 cm, 0.6 cm, 0.8 cm, 1.0 cm, 2.0 cm, 4.0 cm or more; low to no error regions may have distance errors of less than approximately 0.05 cm, 0.1 cm, 0.2 cm, 0.3 cm, 0.5 cm, 1.0 cm, or more; and moderate error regions may have distance errors between the high and low error regions (e.g., moderate error regions may have distance errors that are less than the high error regions such as distance errors of less than 0.2 cm, 0.4 cm, 0.6 cm, 0.8 cm, 1.0 cm, 2.0 cm, or 4.0 cm or more, but that are more than the low error regions such as distance errors of more than approximately 0.5 cm, 0.1 cm, 0.2 cm, 0.3 cm, 0.5 cm, 1.0 cm, or more). As one example, the high error regions may have distance errors in excess of approximately 0.4 cm, the moderate error regions may have distance errors between approximately 0.4 cm and approximately 0.1 cm, and the low to no error regions may have distance errors less than approximately 0.1 cm. These are merely illustrative examples. Colors, or other suitable visual indicators, may be utilized to enable quick visual monitoring by human animators of the disclosed processes for transferring base meshes onto target meshes.

Although the heatmaps shown in FIGS. 11A and 11B illustrate three error regions using different styles of hatching, this is for illustration and is not intended to be limiting. Any number of error regions can be used (e.g., 2, 3, 4, 5, 10, 20, or more). Further, the hatching is intended to provide a clear visual indication of where the errors occur. In some arrangements, different error regions may be illustrated via coloring (similar to a heatmap showing weather temperatures). In a fully automated system, the system would not need to apply hatching (or other graphical indicia such as colors or other suitable patterns or visual indicators) to the different error regions. However, some systems may generate and render a graphical representation of the heatmap to display to human animators where errors of differing amounts occur. In other embodiments, additionally or alternatively to a heatmap, other graphical representations of the error may be generated such as, e.g., a contour plot or any other available graphic techniques. Additionally, although the different error regions have been described as red, green, and blue (from high, to medium, to low errors), any colors could be used, or any type of quantitative or qualitative scale (e.g., a numerical scale or a grade scale (e.g., A, B, C)) could be used.

As will be further described below, different mesh transfer or mesh matching techniques can be used in different error regions to register and conform the base mesh onto the target mesh. Because any particular mesh transfer technique will have its own unique strengths and weaknesses, the system advantageously can use an appropriate technique for each error region. For example, a rigid mesh transfer technique may perform well to register the base mesh and the target mesh in regions of relatively high error but perform less well to conform the two meshes to each other in regions of relatively low error. Conversely, a non-rigid mesh transfer technique may perform less well in regions of relatively high error, but perform well to conform the base mesh to the target mesh in regions of relatively low error. Accordingly, an implementation of the mesh transfer system uses a rigid transfer technique in high error regions (e.g., single-line hatched regions 1132 in the heatmap 1130), a non-rigid transfer technique in medium error regions (e.g., double-line hatched regions 1134 in the heatmap 1130), and no additional transfer is performed in low error regions (e.g., cross-hatched regions 1136 in the heatmap 1130) where the two meshes are substantially the same. Thus, the system may advantageously apply the appropriate mesh transfer technique to each type of region in the heatmap. Further, the system may iterate this approach to progressively match the base and target meshes until all (or substantially all) the regions of the mesh are in the low error (e.g., cross-hatched or blue) region of the heatmap.

FIG. 11B illustrates a second example of matching a base mesh to a target mesh to obtain a transfer mesh. In particular, FIG. 11B illustrates a base mesh 1140 of a shirt, which may be modeled as clothing on an avatar, a target mesh 1150, and a heatmap 1160. The base mesh 1140 may represent the results of deforming a rig of the shirt from a neutral pose into the illustrated pose (e.g., a pose in which a lower portion of the shirt is raised, such as due to the underlying avatar's leg being lifted causing the illustrated deformation of the shirt). As shown in FIG. 11B, the error between the base and target meshes may be most pronounced in the region where the avatar or user's left leg is lifting the shirt. As an example, base mesh 1140 may have a region 1142 where the user's leg does not lift the shirt in a natural manner, whereas target mesh 1150 may illustrate a natural curve to the shirt in region 1152. The target mesh 1150 may represent a scanned reference of a shirt deformed into the illustrated pose (e.g., a scan of a model or a user wearing the shirt and posing in a manner that deforms the shirt as illustrated) or may be artist modeled mesh. The transfer mesh 1160 may represent the base mesh conformed to the target mesh, with regions of different error identified. As an example, regions 1162, 1164, and 1166 may respectively represent regions of high, medium, and low positional error between the base and target meshes.

Example Rigid Transformations

Avatar processing and rendering system 690 of FIG. 6B, or another suitable system, may match a base mesh to a target mesh by transforming or deforming the base mesh using a variety of techniques. As one example, matching the base mesh to the target mesh may involve rigid transformations. Rigid transformations may be applied in regions with high degrees of error, high degrees of curvature, or areas with high error and high curvature. Rigid transformations do not change the size or shape of the region of the base mesh being transformed, e.g., the distances between the vertices in the region are not changed by the transformation. Examples of rigid transformations that may be applied to the base mesh to match the target mesh to the target mesh include, but are not limited to, a rigid nearest-neighbor transformation, a rigid nearest-neighbor (NN) transformation with falloff, linear transformations such as rotation and translation, transformations with or without falloff, and combinations of these and other transformations. Another example of a rigid transformation is an iterative closest point (ICP) algorithm. In other embodiments, the system 690 may utilize an affine transformation to transform or deform the base mesh.

Figure 12A:
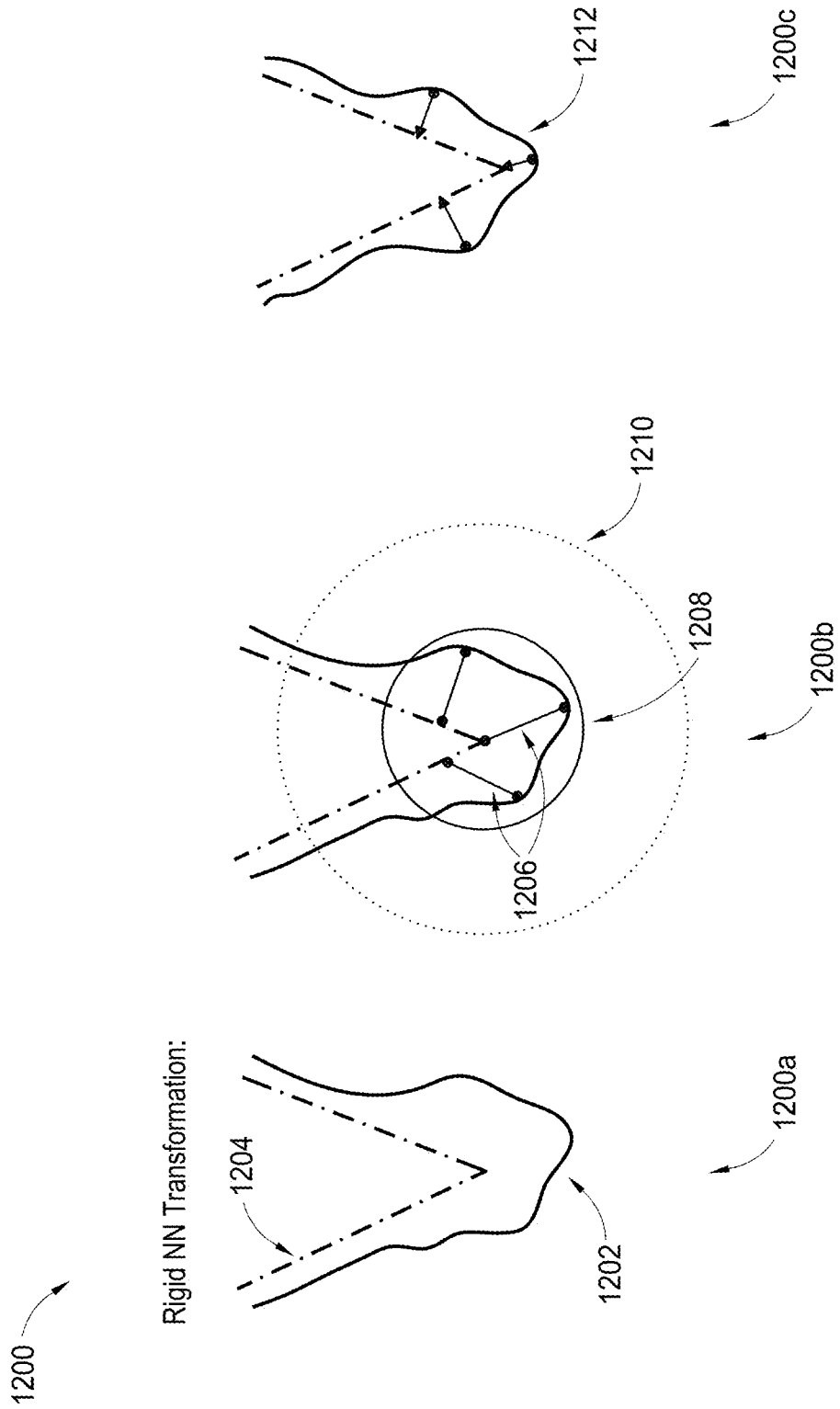
FIG. 12A illustrates an example of an application of a rigid transformation, such as a rigid nearest neighbor transformation, of a base mesh towards a target mesh.

An example application of a rigid nearest-neighbor transformation process 1200 is shown in FIG. 12A. As shown in FIG. 12A, a base mesh 1202 may be transformed such that the vertices of the base mesh 1202 are closer to the vertices of a target mesh 1204. In 1200a, high error regions of base mesh 1202 and target mesh 1204 may be determined. In 1200b, avatar processing and rendering system 690 or another suitable system may identify the nearest neighbors for some or all of the vertex points of the base mesh 1202. As an example, FIG. 12A illustrates the nearest neighbors 1206 on the target mesh 1204 for three difference vertex points on the base mesh 1202. The rigid NN process may utilize the n nearest neighbors where n is 1, 2, 3, 4, 5, 6, or more. As shown in 1200c, avatar processing and rendering system 690 or another suitable system may then rigidly transform the base mesh 1202 towards the target mesh 1204. In other words, the system may attempt to minimize or optimize the mean of the distances between vertex points on the base mesh 1202 and their corresponding nearest neighbor on the target mesh 1204, without altering the shape of the base mesh 1202, but instead translating, rotating, or applying other rigid transformations to the base mesh 1202.

In at least some embodiments, the rigid transformation of the base mesh 1202 towards the target mesh 1204 may be subject to a falloff, which feathers the rigid deformations into nearby areas with lower error. Individual regions of the base mesh with high errors may be rigidly transformed towards the target mesh, while nearby regions with lower errors are rigidly or non-rigidly transformed with a weighted falloff in the falloff region. In at least some embodiments, individual regions that are rigidly transformed may include a region that is rigidly transformed (such as the area inside region 1208), perimeter regions that are not transformed (such as the area outside region 1210), and intermediate regions (such as the area between regions 1208 and 1210) that are smoothly transitioned between the rigidly transformed region 1208 to the area outside region 1210 that may not be transformed (or that may be transformed using other techniques, including non-rigid deformation techniques).

A falloff in the rigid transformation may permit regions of high error to be corrected without the resulting transformations creating new error in adjacent regions. An example of falloff is illustrated in 1200b and 1200c of FIG. 12A. In particular, 1200b illustrates a falloff start region 1208 and a falloff end region 1210. Within the falloff start region 1208, the rigid transformation of the base mesh 1202 towards the target mesh 1204 may be performed (e.g., the system may attempt to minimize the mean of the distances between nearest neighbors without altering the shape of the transformed mesh). In contrast, the system may leave the base mesh 1202 relatively unchanged outside region 1210. In the intermediate region 1210, the system may transform the base mesh 1202 using a weighted falloff of the rigid transformation technique applied inside region 1208 to provide a smooth transition between rigidly transformed region 1208 and the portions of base mesh 1202 outside region 1210. The weighted falloff of the feathering transition applied from the falloff boundary 1208 to the falloff boundary 1210 may be linear, quadratic, exponential, or any other suitable falloff, in various embodiments.

The size of region rigidly transformed by the system may, in some embodiments, vary as a function of the initial error between the base and target meshes 1202 and 1204. As an example, the system may identify the number n of vertices in the base mesh 1202 that have an error level above some threshold. The system may then identify, from the set of vertices having error levels above the threshold, a subset of vertices having the largest errors (e.g., the system may identify n/2 of the vertices as the vertices with the largest errors). The system may then rigidly transform the subset of vertices with the largest errors (e.g., the n/2 of the vertices with the largest errors) to match the target mesh 1204, based on a nearest neighbors approach. In some embodiments, the system may utilize an iterative closest point (ICP) transformation to rigidly transform the subset of vertices with the largest errors to match the target mesh 1204.

The size of the fall-off region (e.g., the radii of regions 1208 and 1210) may be set based at least partly on the size of the object being transformed (e.g., a size of the high error region) or may vary as a function of the error between the base and target meshes 1202 and 1204. As an example, the falloff radius may be set to $\pi$ times the square root of x, with x being equal to the largest error value (e.g., the largest single distance between any given vertex in the base mesh 1202 and its corresponding neighbor in the target mesh 1204) within the region being rigidly transformed. The fall-off region may serve to feather the rigid nearest neighbor transformation into adjacent vertices having lower error values (and for which no transformation or a non-rigid transformation may be applied). In some embodiments, the center of the fall-off sphere may be set to the center of the region being rigidly transformed. In other embodiments, the center of the fall-off sphere may be set to the vertex on the target mesh 1204 associated with the largest error value.

In 1200c of FIG. 12A, an example output is illustrated, where the input base mesh 1202 has been rigidly transformed into shape 1212. Consistent with the discussion above, the transformation of the input base mesh 1202 may be generally rigid inside of the falloff region 1208, no transformation or a non-rigid transformations may be applied outside region 1210, and the system may smoothly feather (e.g., in region 1210, but outside 1208) the rigid transformation within region 1208 to the no or non-rigid transformation outside region 1210. Feathering with a falloff region is optional but may provide advantages as will be described with reference to FIG. 13 (e.g., reduction in sharpness or staircasing of the mesh).

Example Non-Rigid Deformations

Other techniques that may be used, by avatar processing and rendering system 690 of FIG. 6B or another suitable system, for matching a base mesh to a target mesh include non-rigid deformations. Non-rigid deformations may be applied in regions with moderate to low degrees of error (e.g., distances between vertices on the base mesh and corresponding vertices on the target mesh) or regions with moderate to low curvature errors. In non-rigid transformations, distances between vertices of the mesh are permitted to change under the transformation, and the size (or shape) of the region may change. Examples of non-rigid transformations that may be applied to the base mesh to match the target mesh include, but are not limited to, a closest point on surface deformation (CPOS), an iterative closest point on surface deformation, an elastic registration, a physical deformation model (e.g., a model that simulates skin), etc. These are merely illustrative examples and, in general, any desired non-rigid (or rigid) deformation may be applied in areas of low to moderate error.

Figure 12B:
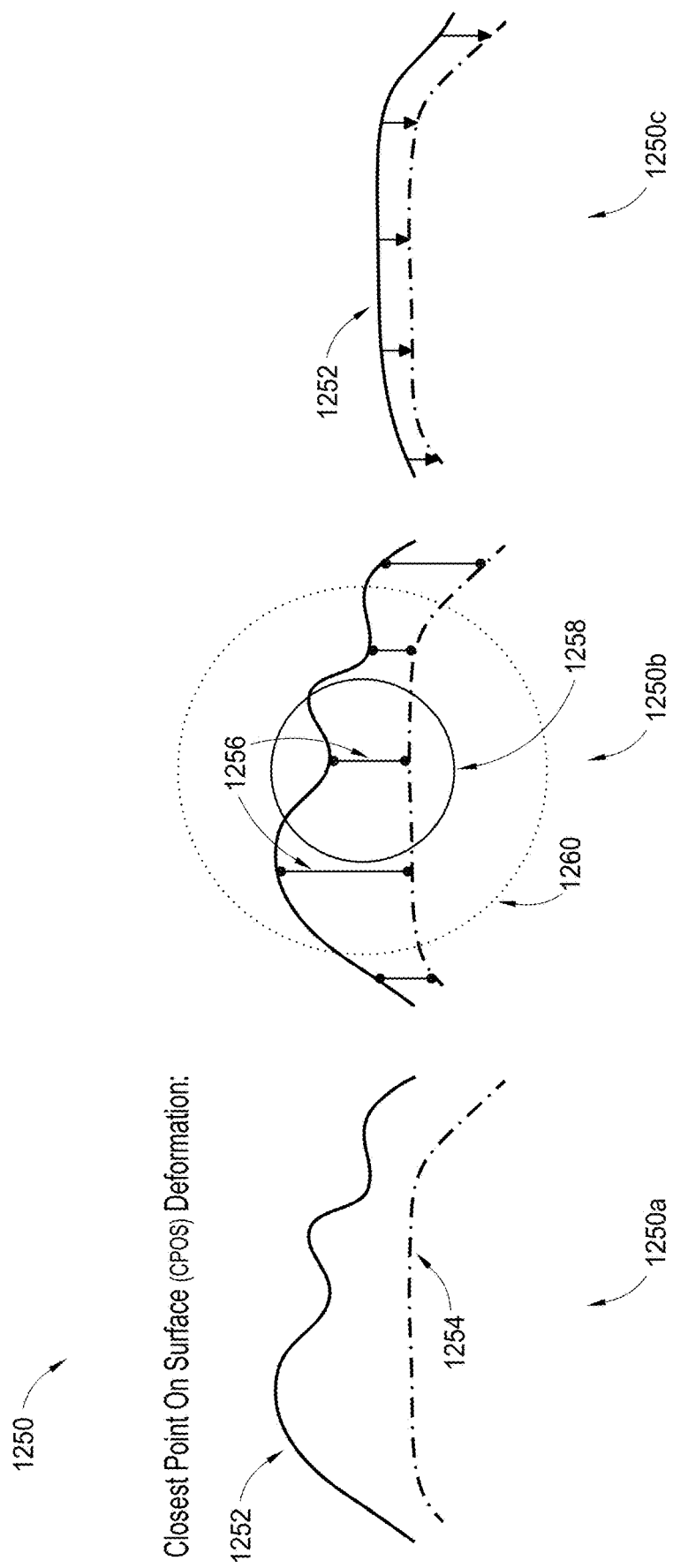
FIG. 12B illustrates an example of an application of a non-rigid deformation, such as a closest point on surface deformation, of a base mesh towards a target mesh.

An example application of a non-rigid closest point on surface (CPOS) process 1250 is shown in FIG. 12B. As shown in FIG. 12B, a base mesh 1252 may be deformed (e.g., transformed non-rigidly) such that the vertices of the base mesh 1252 are closer to the vertices of the target mesh 1254. In at least some embodiments, non-rigid deformations may conform the base mesh to the target mesh as if the base mesh were vacuum-formed to the target mesh. In 1250a, medium error regions of base mesh 1252 and corresponding regions of target mesh 1254 may be identified or obtained. In 1250b and for each vertex in the identified regions of the base mesh 1252, the closest point on the surface of the target mesh 1254 (e.g., the closest vertex of the target mesh 1254) may be identified. FIG. 12B illustrates, as examples, the closest points 1256 for five different vertices of the base mesh 1252 and the five corresponding closest points on the surface of the target mesh 1254.

As shown in 1250c, avatar processing and rendering system 690 or another suitable system may then non-rigidly deform the base mesh 1252 (e.g., base mesh regions with medium levels of error) towards the target mesh 1254 (e.g., target mesh regions corresponding to the base mesh regions with medium levels of error). In other words, the system may attempt to reduce, potentially all the way to zero, the distance between each vertex in the base mesh 1252 and the closest point on the target mesh 1254. If desired, the system may employ an iterative CPOS process in which initial closest points on the surface are calculated, the base mesh vertices are shifted some fraction of the way towards their respective closest points on the surface of the target mesh, then closest points are recalculated and the base mesh vertices shifted some additional fraction (or remainder) of the way towards their respective closest points on the surface of the target mesh. As shown in step 1250c, the system may deform the base mesh 1252 until the base mesh 1252 is substantially conformed to the target mesh 1254 and, as such, the initial shape of the base mesh 1252 may be transformed into the shape of the target mesh 1254.

As with the rigid transformations described in connection with FIG. 12A, the system may (optionally) utilize a falloff in the non-rigid deformation of FIG. 12B. A falloff in the non-rigid deformation may permit regions of moderate or medium error to be corrected without the resulting transformations creating new error in adjacent regions of lower error. An example of falloff for the non-rigid transformation of FIG. 12B is illustrated in 1250b, which includes a falloff start region 1258 and a falloff end region 1260. Within the falloff start region 1258, the CPOS deformation process may proceed as described here with each vertex of the base mesh moving towards the vertex on the target mesh closest to that base mesh vertex. Outside the falloff end region 1260, the system may leave the base mesh 1252 relatively unchanged. In the intermediate region, the system may feather the CPOS deformation (e.g., the system may provide more CPOS deformation for vertices closer to falloff start region 1258 and less for vertices closer to the outer edges of the falloff region). The falloff in the CPOS deformation may help to average out the effect of any one vertex, thereby improving the apparent connectivity of vertices in the deformed base mesh 1252, reducing artifacts such as sharpness or staircasing, and reducing the amount of potential error in the matching process. If desired, however, the system may apply a non-rigid deformation without falloff.

Falloff Radius in Non-Rigid Deformations

Figure 13:
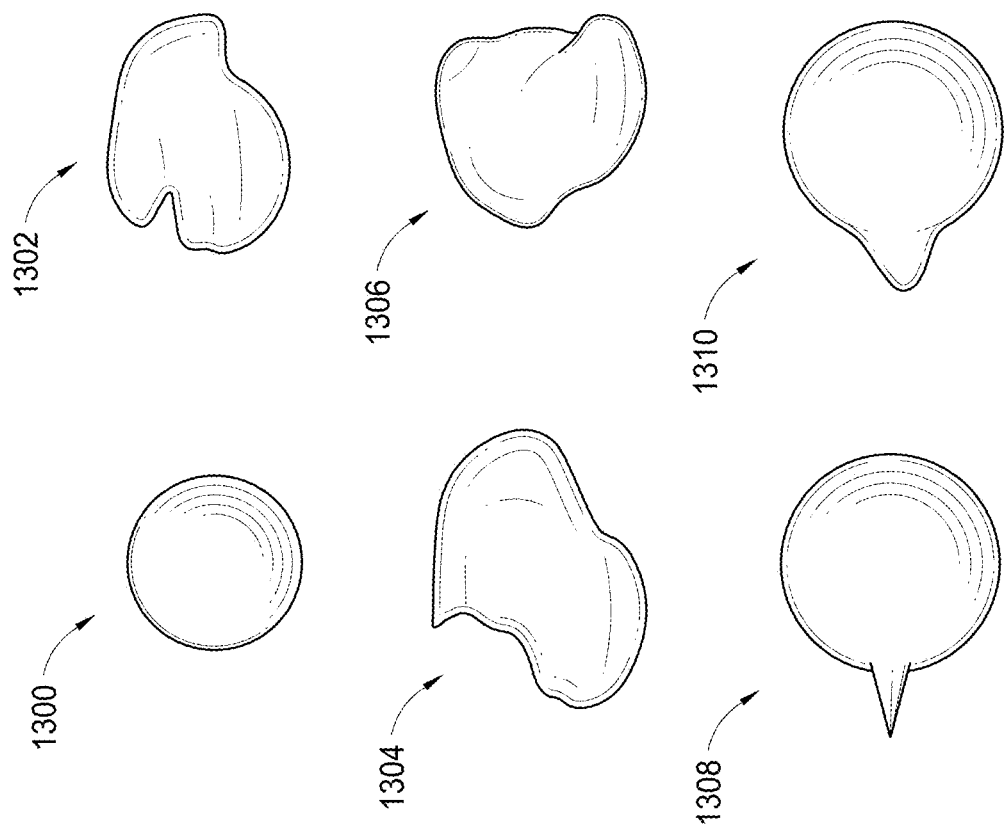
FIG. 13 illustrates various examples of different falloff radii in closest point on surface deformations, or other non-rigid deformations.

FIG. 13 illustrates examples of the impact of altering falloff in closest point on surface (CPOS) deformations, or other non-rigid deformations.

Image 1300 shows a base mesh. Image 1302 shows the base mesh after a CPOS deformation with no fall off.

Images 1304 and 1306 show the base mesh after CPOS deformations with fall off. As can be seen in images 1304 and 1306, the CPOS deformations with fall off result in a smoother output (e.g., a smoother matched mesh).

Image 1308 shows the result of a CPOS deformation without falloff of the base mesh from image 1300. As shown in image 1308, a single vertex is pulled away from the sphere, which caused a spike to extend from the sphere. If falloff had been applied, the single vertex would appear as image 1310 instead, which appears more as a rounded bulge.

Figure 14A:
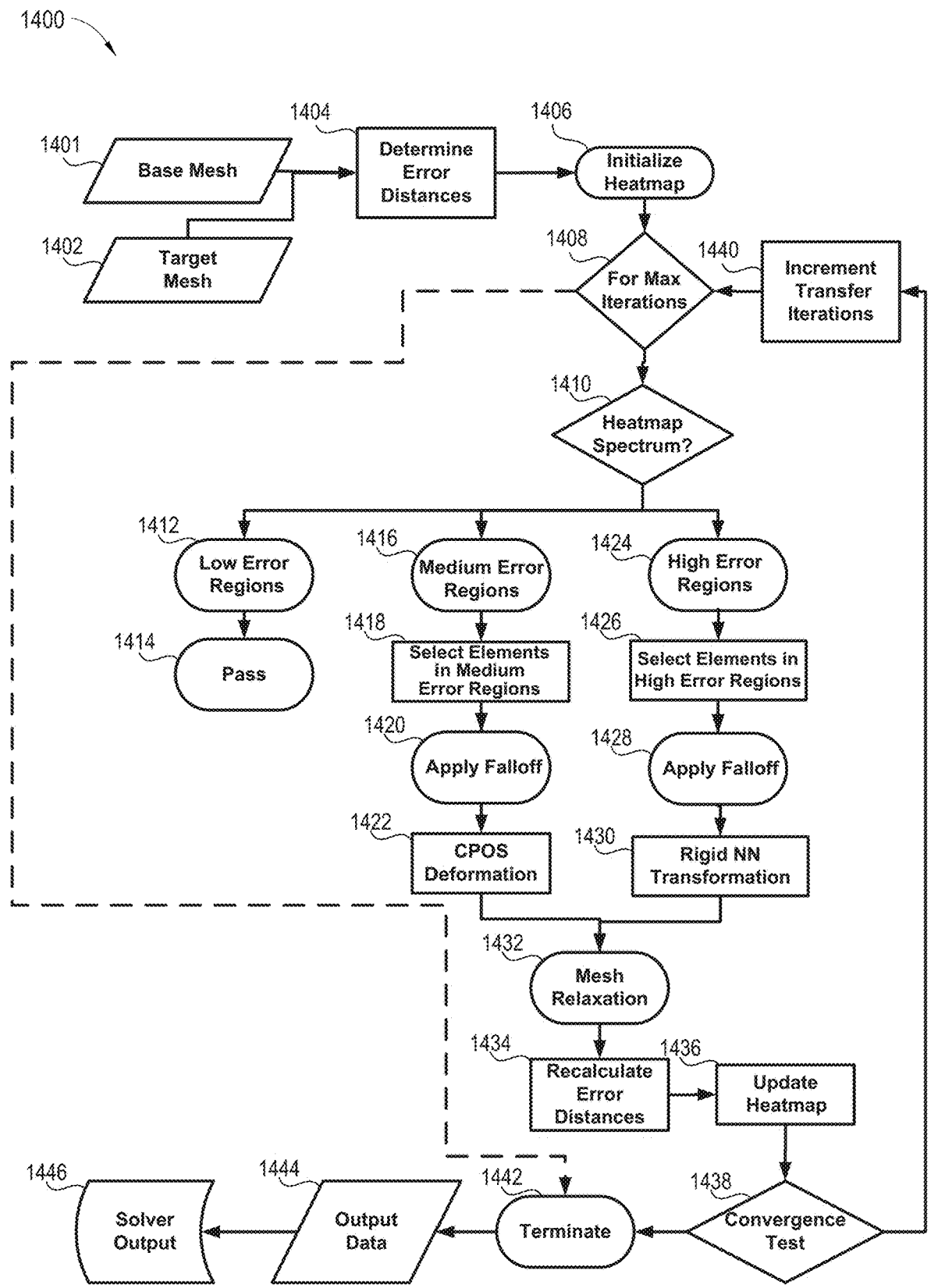
FIGS. 14A-14C illustrate example processes for matching base meshes to target meshes.
Figure 14B:
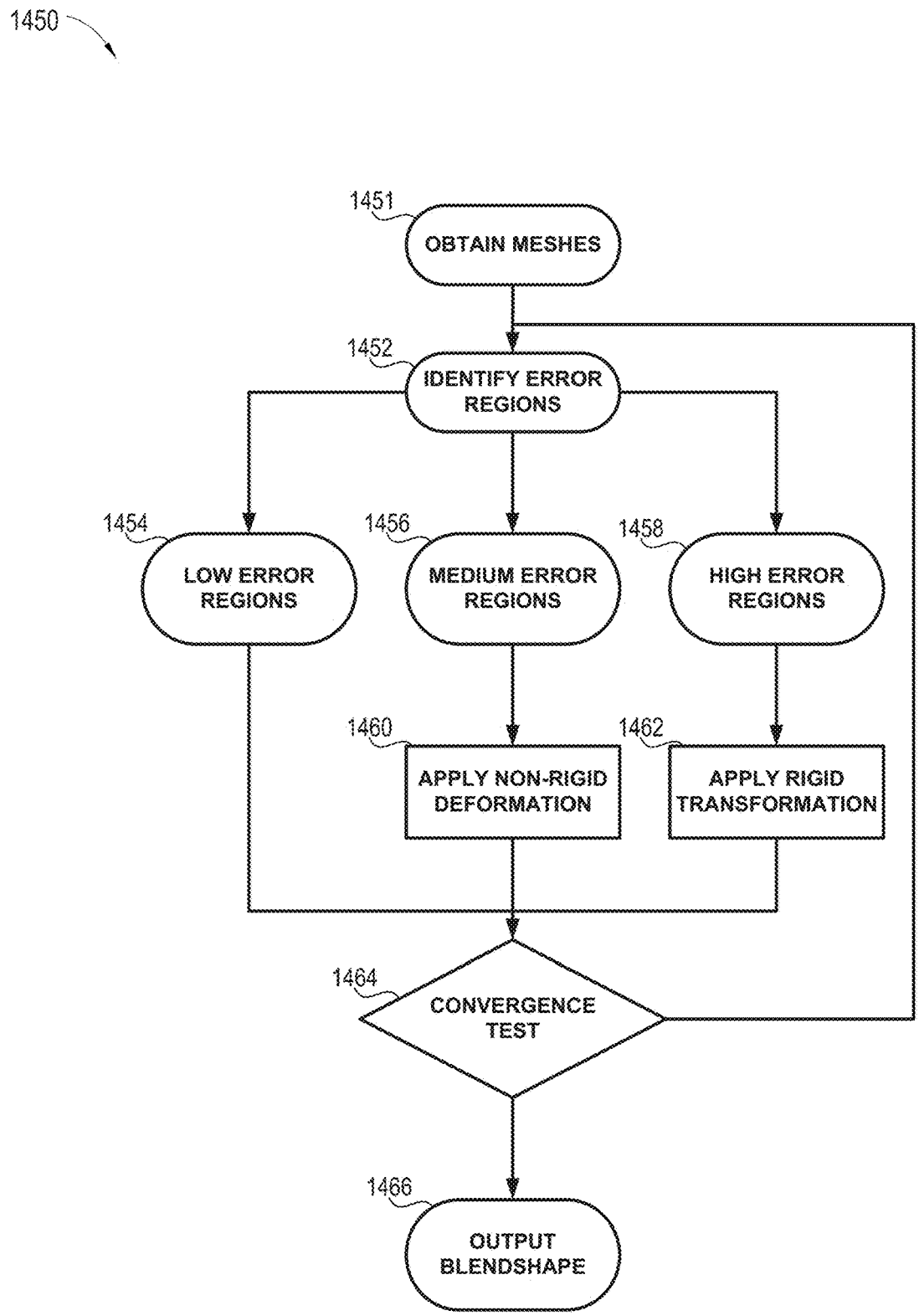
Figure 14C:
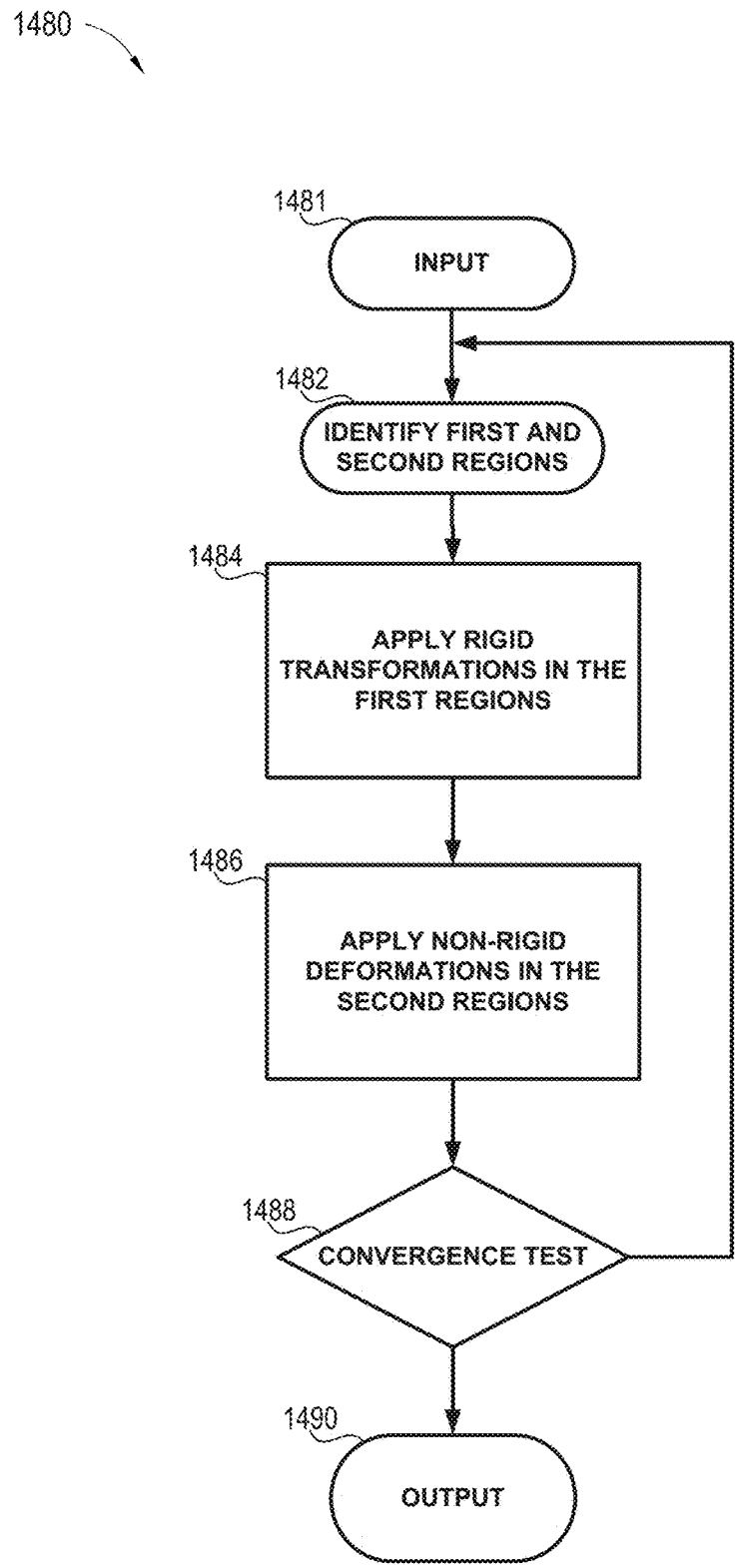

Example Processes for Matching Target Meshes to Base Meshes Using Iterations of Rigid FIGS. 14A-14C illustrate example processes for matching base meshes to target meshes. The example process 1400 may be performed by one or more computing systems including the remote processing module 270, the local processing and data module 260, the avatar processing and rendering system 690 of FIG. 6B, the remote computing system 920 of FIG. 9A, other suitable computing device(s), and combinations of these and other computing devices.

In FIG. 14A, at blocks 1401 and 1402, the computing system can obtain a base mesh and a target mesh. As discussed herein, the computing system can obtain the base mesh in block 1401 by manipulating a rig of an avatar or object into a desired pose and can obtain the target mesh in block 1402 by scanning a person (or other target such as an object) in the desired pose, such as by obtaining photographs, 3D imagery, position information of multiple points on the person's skin and/or clothing (or the object's surface), etc., or by having an artist sculpt the target pose.

At blocks 1404 and 1406, the computing system may obtain a set of distance errors between the vertices of the base mesh and the corresponding vertices of the target mesh and may initialize a heatmap. With reference to the example of FIGS. 11A and 11B, a heatmap may take the form of a graphical representation of the distance errors such as the heatmaps 1130 and 1160. In other words, the heatmap may visually illustrate regions of different levels of error, such as by highlighting regions of high error in red (or single-line hatching), highlighting regions of medium error in green (or double-line hatching), and highlighting regions of low to no error in blue (or cross-hatching). In general, other means of distinguishing regions of varying error from each other may be used, such as different colors, different intensities, shading, stippling, hatching and cross-hatching, etc. Initializing the heatmap in block 1406 may, if desired, also include segmenting the vertices of the base and target meshes into multiple regions. In particular, the regions identified as having relatively high error may be segmented from other regions and subject to different processing steps than those other regions. The regions having medium and low error may similarly be segmented from other regions and subject to different processing steps.

At block 1408, the computing system can check to see how many iterations of the matching process have been performed. In some embodiments, the computing system may terminate the matching process (e.g., as part of block 1442) after a predetermined number of iterations of the matching process have been completed. In other embodiments, the computing system may terminate the matching process after some other criteria such as if the matching process has exceeded some predetermined amount of time.

At block 1410, the computing system may divide the heatmap into groups based on error levels (e.g., based on the spectrum of the heatmap or the spectrum of the error levels across the base mesh). Divided regions of the heatmap may then be processed differently, accordingly to their error level. As examples, block 1410 may include identifying which regions of the base mesh are low error (e.g., cross-hatched as shown in example FIGS. 11A and 11B) and passing those regions to block 1412, which regions of the base mesh are medium error or green (or double-line hatched) and passing those regions to block 1416, and which regions of the base mesh are high error or red (or single-line hatched) and passing those regions to block 1424.

At block 1414, the computing system may pass low to no error regions, such as the blue regions of the heatmap, without deformation or transformation. In other words, the computing system may determine that these regions of the base mesh are already well matched to the target mesh and no further adjustment is needed.

At blocks 1418, 1420, and 1422, the computing system may select elements (e.g., vertices) of the base mesh 1401 that have medium levels of error relative to the target mesh 1402 and may apply closest point on the surface (CPOS) deformation to the selected vertices of the base mesh 1401. The CPOS deformation applied by the computing system in block 1422 may non-rigidly conform the base mesh 1402 to the target mesh 1402. The CPOS deformation of block 1422 may be performed as described in connection with FIG. 12B. The fall off optionally applied in block 1420 may also be performed as described in connection with FIG. 12B and FIG. 13.

At blocks 1426, 1428, and 1430, the computing system may select elements (e.g., vertices) of the base mesh 1401 that have high levels of error relative to the target mesh 1402 and may apply a rigid nearest-neighbor transformation to the selected vertices of the base mesh 1401. The rigid nearest-neighbor transformation applied by the computing system in block 1430 may rigidly transform the base mesh 1401 towards the target mesh 1402, without deforming the shape of the base mesh 1401. The rigid nearest-neighbor transformation of block 1430 may be performed as described in connection with FIG. 12A and the fall off optionally applied in block 1428 may also be performed as described in connection with FIG. 12A and FIG. 13.

At block 1432, the computing system may perform a mesh relaxation process to address any artifacts introduced by the CPOS deformations and the rigid nearest-neighbor transformations just performed. As an example, the computing system may smooth out any spikes in the transformed base mesh. The relaxation process can comprise a smoothing or filtering process such as a linear or polynomial smoothing process.

At block 1434, the computing system may recalculate error distances between the now-transformed base mesh and the target mesh 1402.

At block 1436, the computing system may optionally update the heatmap by determining which regions of the now-transformed base mesh have low error levels, medium error levels, and if any remaining areas (e.g., vertices or groups of vertices) have high error levels.

At block 1438, the computing system may perform a convergence test. The convergence test may check to see if the now-transformed base mesh has been sufficiently matched to the target mesh 1202, using any desired metrics. As one example, the convergence test of block 1438 may involve identifying whether or not any vertices, individually or as groups, have error values that fall within the medium or high levels. If the computing system determines that the now-transformed base mesh adequately matched the target mesh (e.g., that all of the vertices have error levels that fall within the low to no error range, such as the blue range), the computing system may proceed to block 1442. Otherwise, the computing system may increment an optional counter of the number of transfer iterations that have been completed as part of block 1440 and return to block 1408. As discussed above, once the number of completed transfer iterations matches (or exceeds) some limit, the computing system may proceed to block 1442. If desired, the computing system may use a combination of a convergence test and an iteration count to determine when to proceed to block 1442. As an example, the computing system may relax the convergence test, over time or after some number of iterations, to enable lower-quality matches to pass the convergence test.

At blocks 1442, 1444, and 1446, the computing system may terminate the process of matching base mesh 1401 to target mesh 1402 and may provide desired outputs such as a transfer mesh, blendshape, or other output. As one example, the computing system may output data indicating how vertices in the base mesh 1401 should be moved relative from their initial positions, such that the mesh matches the target mesh 1402.

Examples of Alternative Mesh Transfer Techniques

As an alternative to the above-described arrangement of FIG. 14A, the computing system may only transform high error regions in an initial set of iterations, while leaving medium and low error regions uncorrected, and may correct the medium and low error regions in a later set of iterations. In other words, in FIG. 14B, blocks 1454, 1456, and 1460 may be omitted for an initial set of iterations, such that only the high error regions are roughly matched in the initial set of iterations. The initial set of iterations may, if desired, continue until all or substantially all of the higher error regions have been transformed in a manner that reduces their errors below the high error threshold level (and thus the regions are now classified as low or medium error regions). Then, after the initial set of iterations, blocks 1454, 1456, and 1460 may be performed and blocks 1458, 1462 may be omitted (as unnecessary, or alternatively included but with an empty group since no high error regions exist) in order to finalize the matching of the base mesh to the target mesh.

As yet another alternative, the computing system may divide the input meshes into sub-regions based on something other than error. As examples, the computing system may divide the input meshes into sub-regions arbitrarily using a geometric pattern, such as checkerboard. Then, the computing system may transform just the high error sub-regions (e.g., the "red" sub-regions in the heatmap) as discussed above or may transform high and medium error sub-regions simultaneously, as discussed in connection with the example of FIG. 14A. If desired, the computing system may divide the input meshes into a checkerboard whereby only a fraction (e.g., one-half such as the red spaces of the checkerboard) of the regions are directly transformed while the other one-half (e.g., the white spaces of the checkerboard) of the regions are adjusted indirectly, such as by linear interpolation (e.g., adjusted automatically in response to their connection with vertices that were directly transformed).

FIG. 14B shows another example process 1450 for matching base meshes to target meshes. The example process 1450 may be performed by one or more computing systems including the remote processing module 270, the local processing and data module 260, the avatar processing and rendering system 690 of FIG. 6B, the remote computing system 920 of FIG. 9A, other suitable computing device(s), and combinations of these and other computing devices.

At block 1451, the computing system may obtain meshes to match, including at least one base mesh and at least one target mesh.

At block 1452, the computing system may identify regions of error between the meshes and may segregate regions of the mesh based on error levels. As an example, regions of high error level may be forwarded to block 1458, regions of medium error level may be forwarded to block 1456, and regions of low or no error level may be forwarded to block 1454. Block 1454 may pass regions of low or no error level on to block 1464 without transformation.

At blocks 1460 and 1462, the computing system may apply a desired transformation or deformation to the base mesh, as part of matching the base mesh to the target mesh. As an example, the computing system may apply a rigid transformation in block 1462 to regions of the base mesh that have high error (e.g., are poorly matched with the target mesh) and may apply a non-rigid deformation in block 1460 to the regions of the base mesh that have medium error (e.g., are nearly matched with the target mesh).

At block 1464, the computing system may test the adjusted base mesh to see if it is sufficiently matched to the target mesh. Additionally, the computing system may determine the iterative matching process should cease because a condition has been met, for example, the iterative matching process has exceeded some predetermined number of iterations or some predetermined length of time or a threshold defining a match has been met. If the computing system determines the base mesh is not sufficiently matched (and other conditions for stopping the process are not met), the computing system may return to block 1452. If the computing system determines that the base mesh is sufficiently matched (or other conditions for stopping the process are met), the computing system may proceed to block 1466.

At block 1466, the computing system may output the matched base mesh, which has been matched to the target mesh. In some embodiments, the output of the computing system at block 1466 may be referred to as a blendshape.

FIG. 14C shows another example process 1480 for matching base meshes to target meshes. The example process 1480 may be performed by one or more computing systems including the remote processing module 270, the local processing and data module 260, the avatar processing and rendering system 690 of FIG. 6B, the remote computing system 920 of FIG. 9A, other suitable computing device(s), and combinations of these and other computing devices.

At block 1481, the computing system may receive input meshes such as a base mesh and a target mesh.

At block 1482, the computing system may identify first and second regions within the base mesh. In some embodiments, the first regions may represent regions (e.g., one or more vertices) of the base mesh having relatively high error levels relative to the target mesh and the second regions may represent regions of the base mesh having relatively low error levels. In other embodiments, the first and second regions may be identified based on factors other than error levels. As examples, the first and second regions may be identified by random selection, using a particular pattern (e.g., applying a checkerboard pattern to the base mesh and identifying the white squares in the checkerboard as the first regions and the black squares in the checkerboard as the second regions), or by selecting regions of higher detail (e.g., regions having a greater density of vertices) as the first regions and regions of lower detail as the second regions.

At block 1484, the computing system may apply rigid transformations to the first regions of the base mesh (e.g., the vertices of the base mesh corresponding to the first regions).

At block 1484, the computing system may apply non-rigid deformations to the second regions of the base mesh (e.g., the vertices of the base mesh corresponding to the second regions).

At block 1488, the computing system may test to see if the now-transformed base mesh is sufficiently matched to the target mesh. If not sufficiently matched, the computing system may iterate the matching process, such as by returning to block 1482 as illustrated in FIG. 14C. If sufficiently matched, the computing system may proceed to block 1490 and provide an output, such as a transformed base mesh that matches the target mesh, sometimes referred to as a blendshape. A convergence test may be applied such as that the number of iterations exceeds a maximum number of iterations or a fiducial error between the meshes (e.g., a mean error, a maximum error, etc.) is below a threshold. For example, the threshold may indicate a distance below which the meshes are sufficiently matched (e.g., the threshold distance may be 0.5 cm, 0.1 cm, 0.05 cm, 0.01 cm, etc.).

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

EXAMPLES

Various examples of systems that match a base mesh for a virtual avatar or object to a target mesh of the virtual avatar or object are described herein such as the examples enumerated below:

Example 1: A system for matching a base mesh for a virtual avatar to a target mesh of the virtual avatar, the system comprising: non-transitory computer storage configured to store the target mesh for the virtual avatar and the base mesh for the virtual avatar, the target mesh comprising a plurality of target mesh vertices and the base mesh comprising a plurality of base mesh vertices; and a hardware processor in communication with the non-transitory computer storage, the hardware processor programmed to: (i) determine a plurality of error regions between the target mesh and the base mesh, each error region representing a deviation between positions of the base mesh vertices relative to positions of the target mesh vertices, the plurality of error regions comprising a first error region having a first error and a second error region having a second error, the second error less than the first error; (ii) apply a rigid transformation to the base mesh vertices in the first error region; (iii) apply a non-rigid transformation to the base mesh vertices in the second error region; iterate operations (i), (ii), and (iii) until a transformed base mesh meets a convergence criterion; and output a blendshape for the virtual avatar based at least in part on the transformed base mesh.

Example 2: The system of any of the Examples above, wherein the target mesh is determined from photographic scans of a human or animal subject performing a pose.

Example 3: The system of any of the Examples above, wherein the plurality of error regions comprises a third error region having a third error that is less than the second error.

Example 4: The system of any of the Examples above, wherein the hardware processor is programmed to not apply a transformation to the base mesh vertices in the third region.

Example 5: The system of any of the Examples above, wherein the rigid transformation comprises a rotation and a translation.

Example 6: The system of any of the Examples above, wherein the rigid transformation comprises a rigid nearest-neighbor transformation.

Example 7: The system of any of the Examples above, wherein the non-rigid transformation comprises a closest point on surface transformation.

Example 8: The system of any of the Examples above, wherein one or both of the rigid transformation or the non-rigid transformation comprises a falloff between a first set of vertices and a second set of vertices.

Example 9: The system of any of the Examples above, wherein the hardware processor is further programmed to: determine a first falloff region; determine a second falloff region outside of the first falloff region; apply the rigid transformation or the non-rigid transformation for base mesh vertices in the first falloff region; and feather the rigid transformation or the non-rigid transformation for base mesh vertices in the second falloff region.

Example 10: The system of any of the Examples above, wherein the hardware processor is further programmed to not apply a transformation to base mesh vertices outside the second falloff region.

Example 11: The system of any of the Examples above, wherein the hardware processor is programmed to determine a size of the first falloff region based at least partly on an error value associated with the first error region or the second error region.

Example 12: The system of any of the Examples above, wherein the hardware processor is further programmed to relax the base mesh vertices after completion of operations (ii) and (iii).

Example 13: The system of any of the Examples above, wherein the convergence criterion comprises a maximum number of iterations or an error between the transformed base mesh and the target mesh passing below a threshold error.

Example 14: The system of any of the Examples above, wherein the hardware processor is further programmed to generate a heatmap based at least partly on the plurality of error regions.

Example 15: A system for matching a base mesh for a virtual avatar to a target mesh of the virtual avatar, the system comprising: non-transitory computer storage configured to store the target mesh for the virtual avatar and the base mesh for the virtual avatar, the target mesh comprising a plurality of target mesh vertices and the base mesh comprising a plurality of base mesh vertices; and a hardware processor in communication with the non-transitory computer storage, the hardware processor programmed to: identify a first set of regions of the base mesh; identify a second set of regions of the base mesh; apply a rigid transformation to the base mesh vertices in the first set of regions to provide a transformed base mesh; and output the transformed base mesh.

Example 16: The system of any of the Examples above, wherein the first set of regions and the second set of regions form a checkerboard pattern.

Example 17: The system of any of the Examples above, wherein the hardware processor is programmed to interpolate base mesh vertices in the second set of regions based at least in part on the applied rigid transformation in the first set of regions.

Example 18: The system of any of the Examples above, wherein the hardware processor is programmed to: apply a non-rigid transformation to base mesh vertices of the transformed base mesh in the second set of regions to provide a second transformed base mesh.

Example 19: The system of any of the Examples above, wherein to identify the first or the second set of regions of the base mesh, the hardware processor is programmed to determine errors between positions of the base mesh vertices relative to positions of the target mesh vertices.

Example 20: The system of any of the Examples above, wherein the first set of regions are associated with larger errors than the second set of regions.

Example 21: The system of any of the Examples above, wherein to apply the rigid transformation to the base mesh vertices, the hardware processor is programmed to: feather the rigid transformation for base mesh vertices between the first set of regions and the second set of regions.

Example 22: A method for generating at least one blendshape for a digital representation of a deformable object, the method comprising: obtaining, using computing equipment, first and second meshes, each of which comprises a plurality of mesh vertices; matching, using the computing equipment, the first mesh to the second mesh by: (i) determining distance differences between the mesh vertices of first and second regions of the first mesh relative to the mesh vertices of the second mesh; (ii) applying a first type of transformation to the mesh vertices in the first region of the first mesh to reduce the distance differences associated with mesh vertices in the first region; and (iii) applying a second type of transformation to the mesh vertices in the second region of the first mesh to reduce the distance differences associated with mesh vertices in the second region; and providing, using the computing equipment, a blendshape based at least on the first mesh with transformed mesh vertices.

Example 23: The method of any of the Examples above, wherein the first type of transformation comprises a rigid transformation and wherein the second type of transformation comprises a non-rigid deformation.

Example 24: The method of any of the Examples above, wherein the first type of transformation comprises a rigid transformation in which a shape of the first region of the first mesh is maintained and wherein the second type of transformation comprises a non-rigid deformation in which a shape of the second region of the first mesh is altered to match a shape of a given region of the second mesh.

Example 25: The method of any of the Examples above, wherein matching the first mesh to the second mesh further comprises determining that the distance errors associated with the first region are larger than distance errors associated with the second region.

Example 26: The method of any of the Examples above, wherein matching the first mesh to the second mesh further comprises determining that a convergence criterion is met and wherein providing the blendshape comprises providing the blendshape upon determining that the convergence criterion is met.

Example 27: The method of any of the Examples above, wherein determining that the convergence criterion is met comprises determining that the distance differences between mesh vertices of the first mesh relative to corresponding mesh vertices of the second mesh are less than a given amount.

Example 28: The method of any of the Examples above, wherein matching the first mesh to the second mesh further comprises iterating at least one of operations (ii) and (iii).

Example 29: The method of any of the Examples above, wherein determining that the convergence criterion is met comprises determining that the at least one of operations (ii) and (iii) has been iterated at least a given number of times.

Example 30: The method of any of the Examples above, wherein obtaining, using the computing equipment, the first mesh comprises moving a joint in a digital representation of the deformable object.

Example 31: The method of any of the Examples above, wherein obtaining, using the computing equipment, the second mesh comprises scanning a real-world example of the deformable object.

Example 32: The method of any of the Examples above, wherein obtaining, using the computing equipment, the first mesh comprises moving a joint in a digital representation of the deformable object such that the deformable object is in a given pose.

Example 33: The method of any of the Examples above, wherein obtaining, using the computing equipment, the second mesh comprises scanning a real-world example of the deformable object in the given pose.

Example 34: The method of any of the Examples above, wherein the deformable object comprises a digital avatar of a human and wherein obtaining, using the computing equipment, the first mesh comprises moving the digital avatar of the human into a given pose.

Example 35: The method of any of the Examples above, wherein obtaining, using the computing equipment, the second mesh comprises scanning a person while the person is in the given pose.

Example 36: A system for generating at least one blendshape for a digital representation of a deformable object, the system comprising: non-transitory computer storage configured to store first and second meshes, each of which comprises a plurality of mesh vertices; and a hardware processor configured to match the first mesh to the second mesh, the hardware processor in communication with the non-transitory computer storage and the hardware processor programmed to: (i) determine distance differences between the mesh vertices of first and second regions of the first mesh relative to the mesh vertices of the second mesh; (ii) apply a first type of transformation to the mesh vertices in the first region of the first mesh to reduce the distance differences associated with mesh vertices in the first region; (iii) apply a second type of transformation to the mesh vertices in the second region of the first mesh to reduce the distance differences associated with mesh vertices in the second region; and (iv) provide a blendshape based at least on the first mesh with transformed mesh vertices.

Example 37: The system of any of the Examples above, wherein the first type of transformation comprises a rigid transformation and wherein the second type of transformation comprises a non-rigid deformation.

Example 38: The system of any of the Examples above, wherein the first type of transformation comprises a rigid transformation in which a shape of the first region of the first mesh is maintained and wherein the second type of transformation comprises a non-rigid deformation in which a shape of the second region of the first mesh is altered to match a shape of a given region of the second mesh.

Example 39: The system of any of the Examples above, wherein the hardware processor is programmed to determine that the distance errors associated with the first region are larger than distance errors associated with the second region.

Example 40: The system of any of the Examples above, wherein the hardware processor is programmed to determine that a convergence criterion is met and provide the blendshape upon a determination that the convergence criterion is met.

Example 41: The system of any of the Examples above, wherein the hardware processor is programmed to determine that the convergence criterion is met based on a determination that the distance differences between mesh vertices of the first mesh relative to corresponding mesh vertices of the second mesh are less than a given amount.

Example 42: The system of any of the Examples above, wherein the hardware processor is programmed to iterate at least one of operations (ii) and (iii) to match the first mesh to the second mesh.

Example 43: The system of any of the Examples above, wherein the hardware processor is programmed to determine that the convergence criterion is met based on a determination that the at least one of operations (ii) and (iii) has been iterated at least a given number of times.

Example 44: The system of any of the Examples above, wherein the hardware processor is programmed to move a joint in a digital representation of the deformable object to obtain the first mesh.

Example 45: The system of any of the Examples above, wherein the hardware processor is programmed to scan a real-world example of the deformable object to obtain the second mesh.

Example 46: The system of any of the Examples above, wherein the hardware processor is programmed to move a joint in a digital representation of the deformable object such that the deformable object is in a given pose to obtain the first mesh.

Example 47: The system of any of the Examples above, wherein the hardware processor is programmed to scan a real-world example of the deformable object in the given pose to obtain the second mesh.

Example 48: The system of any of the Examples above, wherein the deformable object comprises a digital avatar of a human and wherein the hardware processor is programmed to move the digital avatar of the human into a given pose to obtain the first mesh.

Example 49: The system of any of the Examples above, wherein the hardware processor is programmed to scan a person while the person is in the given pose to obtain the second mesh.

Example 50: A method for matching a base mesh to a target mesh, the method comprising: obtaining, using computing equipment, the base and target meshes, each of which comprises a plurality of vertices; matching, using the computing equipment, the base mesh to the target mesh by: (i) applying at least one iteration of a first type of transformation to at least some of the vertices of the base mesh until distance differences between the base and target meshes are below a first threshold; and (ii) applying at least one iteration of a second type of transformation to at least some of the vertices of the base mesh until the distance differences between the base and target meshes are below a second threshold, wherein the second threshold is smaller than the first threshold; and providing, using the computing equipment, an output based at least on the base mesh with transformed vertices.

Example 51: The method of any of the Examples above, wherein the first type of transformation comprises a rigid transformation of at least some of the vertices of the base mesh towards corresponding vertices of the target mesh.

Example 52: The method of any of the Examples above, wherein the rigid transformation comprises a rigid nearest-neighbor transformation.

Example 53: The method of any of the Examples above, wherein the second type of transformation comprises a non-rigid deformation of at least some of the vertices of the base mesh towards corresponding vertices of the target mesh.

Example 54: The method of any of the Examples above, wherein the non-rigid deformation comprises a closest point on the surface (CPOS) deformation.

Example 55: The method of any of the Examples above, wherein applying at least one iteration of the second type of transformation until the distance differences are below the second threshold comprises: (a) applying the second type of transformation to at least some of the vertices of the base mesh; (b) determining distance differences between the vertices of the base mesh relative to corresponding vertices of the target mesh; and iterating operations (a) and (b) until the determined distance differences have a mean error below the second threshold.

Example 56: The method of any of the Examples above, wherein applying at least one iteration of the second type of transformation until the distance differences are below the second threshold comprises: (1) applying the second type of transformation to at least some of the vertices of the base mesh; (2) determining distance differences between the vertices of the base mesh relative to corresponding vertices of the target mesh; and iterating operations (1) and (2) until a maximum error in the determined distance differences is below the second threshold.

Example 57: The method of any of the Examples above, wherein applying at least one iteration of the second type of transformation until the distance differences are below the second threshold comprises: (A) applying the second type of transformation to at least some of the vertices of the base mesh; (B) determining distance differences between the vertices of the base mesh relative to corresponding vertices of the target mesh; and iterating operations (A) and (B) until a maximum error in the determined distance differences is less than 0.5 cm.

Example 58: The method of any of the Examples above, wherein the first type of transformation comprises a rigid transformation of at least some of the vertices of the base mesh towards corresponding vertices of the target mesh and wherein applying at least one iteration of the first type of transformation comprises: determining a falloff region; applying the rigid transformation for the vertices of the base mesh in the falloff region; and feathering the rigid transformation for the vertices of the base mesh outside of the falloff region.

Example 59: The method of any of the Examples above, wherein the first type of transformation comprises a rigid transformation of at least some of the vertices of the base mesh towards corresponding vertices of the target mesh and wherein applying at least one iteration of the first type of transformation comprises: identifying a grouping of vertices of the base mesh that have distance differences above the first threshold, wherein a given vertex in the grouping of vertices has the largest distance difference amongst the grouping; determining a size of a falloff region based at least in part on the magnitude of the largest distance difference; applying the rigid transformation for the vertices of the base mesh in the falloff region; and feathering the rigid transformation for the vertices of the base mesh outside of the falloff region.

Example 60: A system for matching a base mesh to a target mesh, the system comprising: non-transitory computer storage configured to store the base and target meshes, each of which comprises a plurality of vertices; and a hardware processor configured to match the base mesh to the target mesh, the hardware processor in communication with the non-transitory computer storage and the hardware processor programmed to: (i) apply at least one iteration of a first type of transformation to at least some of the vertices of the base mesh until distance differences between the base and target meshes are below a first threshold; (ii) apply at least one iteration of a second type of transformation to at least some of the vertices of the base mesh until the distance differences between the base and target meshes are below a second threshold, wherein the second threshold is smaller than the first threshold; and (iii) provide an output based at least on the base mesh with transformed vertices.

Example 61: The system of any of the Examples above, wherein the first type of transformation comprises a rigid transformation of at least some of the vertices of the base mesh towards corresponding vertices of the target mesh.

Example 62: The system of any of the Examples above, wherein the rigid transformation comprises a rigid nearest-neighbor transformation.

Example 63: The system of any of the Examples above, wherein the second type of transformation comprises a non-rigid deformation of at least some of the vertices of the base mesh towards corresponding vertices of the target mesh.

Example 64: The system of any of the Examples above, wherein the non-rigid deformation comprises a closest point on the surface (CPOS) deformation.

Example 65: The system of any of the Examples above, wherein the hardware processor is programmed to: (a) apply the second type of transformation to at least some of the vertices of the base mesh; (b) determine distance differences between the vertices of the base mesh relative to corresponding vertices of the target mesh; and iterate operations (a) and (b) until the determined distance differences have a mean error below the second threshold.

Example 66: The system of any of the Examples above, wherein the hardware processor is programmed to: (1) apply the second type of transformation to at least some of the vertices of the base mesh; (2) determine distance differences between the vertices of the base mesh relative to corresponding vertices of the target mesh; and iterate operations (1) and (2) until a maximum error in the determined distance differences is below the second threshold.

Example 67: The system of any of the Examples above, wherein the hardware processor is programmed to: (A) apply the second type of transformation to at least some of the vertices of the base mesh; (B) determine distance differences between the vertices of the base mesh relative to corresponding vertices of the target mesh; and iterate operations (A) and (B) until a maximum error in the determined distance differences is less than 0.5 cm.

Example 68: The system of any of the Examples above, wherein the first type of transformation comprises a rigid transformation of at least some of the vertices of the base mesh towards corresponding vertices of the target mesh and wherein the hardware processor is programmed to: determine a falloff region; apply the rigid transformation for the vertices of the base mesh in the falloff region; and feather the rigid transformation for the vertices of the base mesh outside of the falloff region.

Example 69: The system of any of the Examples above, wherein the first type of transformation comprises a rigid transformation of at least some of the vertices of the base mesh towards corresponding vertices of the target mesh and wherein the hardware processor is programmed to: identify a grouping of vertices of the base mesh that have distance differences above the first threshold, wherein a given vertex in the grouping of vertices has the largest distance difference amongst the grouping; determine a size of a falloff region based at least in part on the magnitude of the largest distance difference; apply the rigid transformation for the vertices of the base mesh in the falloff region; and feather the rigid transformation for the vertices of the base mesh outside of the falloff region.

Example 70: A method for matching a base mesh to a target mesh, the method comprising: obtaining, using computing equipment, base and target meshes, each of which comprises a plurality of vertices; matching, using the computing equipment, the base mesh to the target mesh by: (i) determining distance differences between at least some of the vertices of the base mesh relative to the target mesh; (ii) identifying a set of vertices in the base mesh that have distance differences above a first threshold; (iii) applying a rigid transformation to the set of vertices in the base mesh to reduce the distance differences of the vertices in the set of vertices and to produce a first transformed base mesh; and (iv) applying a non-rigid deformation to the set of vertices in the first transformed base mesh to further reduce the distance differences of the vertices in the set of vertices and to produce a second transformed base mesh; and providing, using the computing equipment, a blendshape based at least on the second transformed base mesh.

Example 71: The method of any of the Examples above, wherein a shape of the set of vertices is maintained while applying the rigid transformation.

Example 72: The method of any of the Examples above, wherein a shape of the set of vertices is altered to match a shape of corresponding vertices of the target mesh.

Example 73: The method of any of the Examples above, wherein applying the rigid transformation to the set of vertices comprises: (1) applying the rigid transformation to at least some of vertices of the set of vertices; (2) determining distance differences between the vertices of the set of vertices relative to corresponding vertices of the target mesh; and iterating operations (1) and (2) until a first convergence criterion is satisfied.

Example 74: The method of any of the Examples above, wherein the first convergence criterion comprises a criterion that a maximum error in the determined distance differences is below the first threshold.

Example 75: The method of any of the Examples above, wherein the first convergence criterion comprises a criterion that a maximum number of iterations of operations (1) and (2) have been completed.

Example 76: The method of any of the Examples above, wherein applying the non-rigid transformation to the set of vertices comprises: (a) applying the non-rigid transformation to at least some of vertices of the set of vertices; (b) determining distance differences between the vertices of the set of vertices relative to corresponding vertices of the target mesh; and iterating operations (a) and (b) until a second convergence criterion is satisfied.

Example 77: The method of any of the Examples above, wherein the second convergence criterion comprises a criterion that a maximum error in the determined distance differences is below a second threshold.

Example 78: The method of any of the Examples above, wherein the second convergence criterion comprises a criterion that a maximum number of iterations of operations (a) and (b) have been completed.

Example 79: A system for matching a base mesh to a target mesh, the system comprising: non-transitory computer storage configured to store the base and target meshes, each of which comprises a plurality of vertices; and a hardware processor configured to match the base mesh to the target mesh, the hardware processor in communication with the non-transitory computer storage and the hardware processor programmed to: (i) determine distance differences between at least some of the vertices of the base mesh relative to the target mesh; (ii) identify a set of vertices in the base mesh that have distance differences above a first threshold; (iii) apply a rigid transformation to the set of vertices in the base mesh to reduce the distance differences of the vertices in the set of vertices and to produce a first transformed base mesh; (iv) apply a non-rigid deformation to the set of vertices in the first transformed base mesh to further reduce the distance differences of the vertices in the set of vertices and to produce a second transformed base mesh; and (v) provide a blendshape based at least on the second transformed base mesh.

Example 80: The system of any of the Examples above, wherein the hardware processor is programmed to maintain a shape of the set of vertices while applying the rigid transformation.

Example 81: The system of any of the Examples above, wherein the hardware processor is programmed to alter a shape of the set of vertices to match a shape of corresponding vertices of the target mesh.

Example 82: The system of any of the Examples above, wherein the hardware processor is programmed to: (1) apply the rigid transformation to at least some of vertices of the set of vertices; (2) determine distance differences between the vertices of the set of vertices relative to corresponding vertices of the target mesh; and iterate operations (1) and (2) until a first convergence criterion is satisfied.

Example 83: The system of any of the Examples above, wherein the first convergence criterion comprises a criterion that a maximum error in the determined distance differences is below the first threshold.

Example 84: The system of any of the Examples above, wherein the first convergence criterion comprises a criterion that a maximum number of iterations of operations (1) and (2) have been completed.

Example 85: The system of any of the Examples above, wherein the hardware processor is programmed to: (a) apply the non-rigid transformation to at least some of vertices of the set of vertices; (b) determine distance differences between the vertices of the set of vertices relative to corresponding vertices of the target mesh; and iterate operations (a) and (b) until a second convergence criterion is satisfied.

Example 86: The system of any of the Examples above, wherein the second convergence criterion comprises a criterion that a maximum error in the determined distance differences is below a second threshold.

Example 87: The system of any of the Examples above, wherein the second convergence criterion comprises a criterion that a maximum number of iterations of operations (a) and (b) have been completed.

Any of the above Examples can be combined. Additionally, any of the above Examples can be implemented with a single depth plane and/or with one or more variable depth planes (i.e., one or more elements with variable focusing power that provide accommodation cues that vary over time).

What is claimed is:

1. A method for matching a base mesh to a target mesh, the method comprising:
   obtaining, using computing equipment, base and target meshes, each of which comprises a plurality of vertices;
   matching, using the computing equipment, the base mesh to the target mesh by:
   (i) determining distance differences between at least some of the vertices of the base mesh relative to the target mesh;
   (ii) identifying a set of vertices in the base mesh that have distance differences above a first threshold;
   (iii) applying a rigid transformation to the set of vertices in the base mesh to reduce the distance differences of the vertices in the set of vertices and to produce a first transformed base mesh; and
   (iv) applying a non-rigid deformation to the set of vertices in the first transformed base mesh to further reduce the distance differences of the vertices in the set of vertices and to produce a second transformed base mesh; and
   providing, using the computing equipment, a blendshape based at least on the second transformed base mesh.

2. The method of claim 1, wherein the target mesh is determined from photographic scans of a human or animal subject performing a pose.

3. The method of claim 1, wherein the rigid transformation comprises a rotation and a translation.

4. The method of claim 1, wherein the rigid transformation comprises a rigid nearest-neighbor transformation.

5. The method of claim 1, wherein the non-rigid deformation comprises a closest point on surface transformation.

6. The method of claim 1, further comprising:
   determining a first falloff region;
   determining a second falloff region outside of and enclosing the first falloff region, the second falloff region associated with a lower error in the distance differences than the first falloff region;
   applying the rigid transformation or the non-rigid deformation for base mesh vertices in the first falloff region; and
   feathering the rigid transformation or the non-rigid deformation for base mesh vertices in the second falloff region.

7. The method of claim 6, further comprising not applying a transformation to base mesh vertices outside the second falloff region.

8. The method of claim 1, further comprising removing one or more artifacts from the second transformed base mesh after completion of operations (iii) and (iv).

9. The method of claim 1, wherein providing the blendshape is performed responsive to determining that a convergence criterion has been met.

10. A system for matching a base mesh to a target mesh, the system comprising:
    non-transitory computer storage configured to store the base and target meshes, each of which comprises a plurality of vertices; and
    a hardware processor configured to match the base mesh to the target mesh, the hardware processor in communication with the non-transitory computer storage and the hardware processor programmed to:
    (i) determine distance differences between at least some of the vertices of the base mesh relative to the target mesh;
    (ii) identify a set of vertices in the base mesh that have distance differences above a first threshold;

(iii) apply a rigid transformation to the set of vertices in the base mesh to reduce the distance differences of the vertices in the set of vertices and to produce a first transformed base mesh;

(iv) apply a non-rigid deformation to the set of vertices in the first transformed base mesh to further reduce the distance differences of the vertices in the set of vertices and to produce a second transformed base mesh; and (v) provide a blendshape based at least on the second transformed base mesh.

11. The system of claim 10, wherein the target mesh is determined from photographic scans of a human or animal subject performing a pose.

12. The system of claim 10, wherein the rigid transformation comprises a rotation and a translation.

13. The system of claim 10, wherein the rigid transformation comprises a rigid nearest-neighbor transformation.

14. The system of claim 10, wherein the non-rigid deformation comprises a closest point on surface transformation.

15. The system of claim 10, wherein the hardware processor is further programmed to:

determine a first falloff region;

determine a second falloff region outside of and enclosing the first falloff region, the second falloff region associated with a lower error in the distance differences than the first falloff region;

apply the rigid transformation or the non-rigid deformation for base mesh vertices in the first falloff region; and feather the rigid transformation or the non-rigid deformation for base mesh vertices in the second falloff region.

16. The system of claim 15, wherein the hardware processor is further programmed to not apply a transformation to base mesh vertices outside the second falloff region.

17. The system of claim 10, wherein the hardware processor is further programmed to remove one or more artifacts from the second transformed base mesh after completion of operations (iii) and (iv).

18. The system of claim 10, wherein the hardware processor is programmed to provide the blendshape is responsive to a determination that a convergence criterion has been met.

19. A system for generating at least one blendshape for a digital representation of a deformable object, the system comprising:

non-transitory computer storage configured to store first and second meshes, each of which comprises a plurality of mesh vertices; and a hardware processor configured to match the first mesh to the second mesh, the hardware processor in communication with the non-transitory computer storage and the hardware processor programmed to:

(i) determine distance differences between the mesh vertices of first and second regions of the first mesh relative to the mesh vertices of the second mesh;

(ii) apply a first type of transformation to the mesh vertices in the first region of the first mesh to reduce the distance differences associated with mesh vertices in the first region;

(iii) apply a second type of transformation to the mesh vertices in the second region of the first mesh to reduce the distance differences associated with mesh vertices in the second region; and (iv) provide a blendshape based at least on the first mesh with transformed mesh vertices.

20. A system for matching a base mesh to a target mesh, the system comprising:

non-transitory computer storage configured to store the base and target meshes, each of which comprises a plurality of vertices; and a hardware processor configured to match the base mesh to the target mesh, the hardware processor in communication with the non-transitory computer storage and the hardware processor programmed to:

(i) apply at least one iteration of a first type of transformation to at least some of the vertices of the base mesh until distance differences between the base and target meshes are below a first threshold;

(ii) apply at least one iteration of a second type of transformation to at least some of the vertices of the base mesh until the distance differences between the base and target meshes are below a second threshold, wherein the second threshold is smaller than the first threshold; and (iii) provide an output based at least on the base mesh with transformed vertices, wherein the first type of transformation comprises a rigid transformation of at least some of the vertices of the base mesh towards corresponding vertices of the target mesh, wherein the rigid transformation comprises a rigid nearest-neighbor transformation, wherein the second type of transformation comprises a non-rigid deformation of at least some of the vertices of the base mesh towards corresponding vertices of the target mesh, and wherein the non-rigid deformation comprises a closest point on the surface (CPOS) deformation.

* * * * *